US008406687B2

(12) United States Patent
Thome et al.

(10) Patent No.: US 8,406,687 B2
(45) Date of Patent: Mar. 26, 2013

(54) MANAGING A DYNAMIC DATA POOL ON AD-HOC NETWORKS

(75) Inventors: Timothy Thome, Spring Valley, CA (US); Joel King, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 1303 days.

(21) Appl. No.: 12/139,331

(22) Filed: Jun. 13, 2008

(65) Prior Publication Data

US 2009/0313310 A1 Dec. 17, 2009

(51) Int. Cl.
*H04B 7/00* (2006.01)
(52) U.S. Cl. ........................ 455/41.2; 455/418
(58) Field of Classification Search ........................ None
See application file for complete search history.

(56) References Cited

U.S. PATENT DOCUMENTS

2001/0054060 A1* 12/2001 Fillebrown et al. ......... 455/41 X

* cited by examiner

*Primary Examiner* — Philip J Sobutka

(57) ABSTRACT

A dynamic data pool on ad-hoc networks. The present example provides for a "swarm" of nodes that share or provide a "repository" of shared dynamic data. The swarm is a collection of nodes connected via networks, including but not limited to Wireless personal area network ("PAN"), local area network ("LAN"), wide area network ("WAN") and/or the like. The dynamic data pool may be implemented by an application program, with network connectivity provided through programs constructed in a layered structure ("network stack") or the like. Provision is made for initializing the swarm, for nodes entering and leaving the swarm, and other functions for managing the swarm.

20 Claims, 21 Drawing Sheets

MANAGING A DYNAMIC DATA POOL ON AD-HOC NETWORKS

FIELD OF THE INVENTION

This description relates generally to networked communications and more specifically to adaptive networks that may be configured dynamically.

BACKGROUND

Radio networks and other similar data and information exchange structures, often depend upon an infrastructure for implementation. For example cellular radio networks typically are provided with an infrastructure through which the radios (cellular telephones) contact each other. A computer network may also provide wireless interconnectivity through a wired and/or wireless network to exchange information which may typically reside in one or more data bases. Trunked radios, such as might be found in a police or fire department may rely on a dispatch, or other central control for their operation. In the case of a first responder such as a fire department the dispatch may, in addition to routing calls, take on the role of information distribution.

In an emergency situation communications infrastructures can often be disrupted, which can cause a loss of connectivity and disrupt information exchange. In the case of cellular telephones if the cellular telephone towers lose power, or are destroyed, the telephones can lose connectivity. A similar situation arises in a computer network; a disruption in the network structure can disrupt the exchange of information. In a radio network such as in a fire department radio system individual radios and their operators may contact each other directly. For example the available channels can be scanned by a unit arriving in an area, and once an active channel is found a radio can establish communications with one or more radios using the channel found. Once communications are established information can be exchanged. Units may arrive and leave, with the arriving units establishing communications and seeking update information, or otherwise coming up to speed will inquire, or attempt to learn the current status by listening in.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides for a "swarm" of nodes that share or provide a "repository" of shared dynamic data. The swarm is a collection of nodes connected via networks, including but not limited to Wireless personal area network ("PAN"), local area network ("LAN"), wide area network ("WAN") and/or the like. The dynamic data pool may be implemented by an application program, with network connectivity provided through programs constructed in a layered structure ("network stack") or the like. Provision is made for initializing the swarm, for nodes entering and leaving the swarm, and other functions for managing the swarm.

Many of the attendant features will be more readily appreciated as the same becomes better understood by reference to the following detailed description considered in connection with the accompanying drawings

BRIEF DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
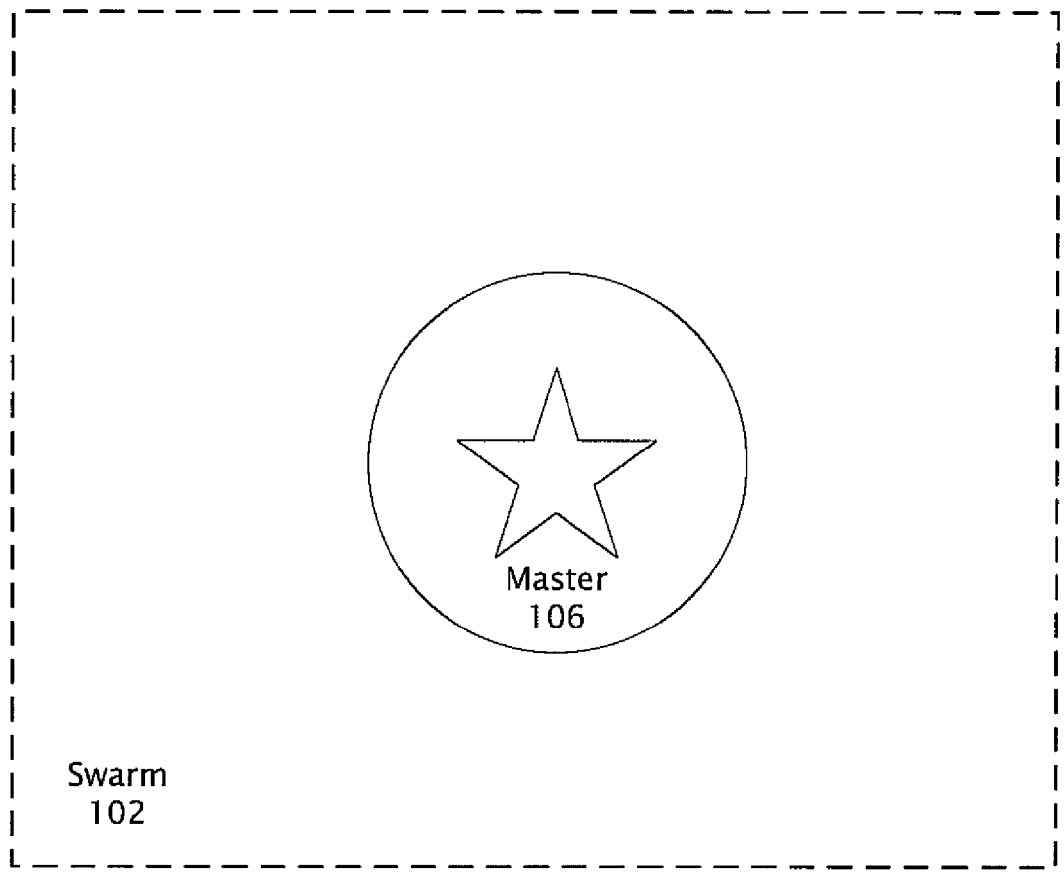
FIG. 1 is a block diagram of a single node network.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Dynamic Data Pools provide for the creation and management of a dynamic data repository (shared or otherwise managed) across a loosely coupled ad-hoc network. The network can be made up of a plurality of nodes. A node can be a radio, cell phone, PDA computer, a wireless device, a wired device, or the like that may be networked. Thus the nodes themselves may be coupled into an ad-hoc network that is either wired, wireless, or a combination of both. Each of these devices typically is equipped with a processor and memory capable of being coupled together to function collectively, including forming a dynamic data repository, or data base that can be shared, duplicated and updated. The dynamic data repository can allow information relative to the ad-hoc network formed to be shared across the network. Information shared may be relative to the use of the network, such as fire tracking, emergency units in the area, roads currently under closure, current evacuation areas, and the like. Dynamic data pools in ad hoc networks may also useful in telematics (in which car to car or node to node transmissions occur) to pass through of relevant information. Also, ad-hoc social networking such as 'flashmobs' or the like, where people join up seemingly at random, and need to share information or to perform a task for a short time and then disperse may advantageously utilize dynamic data pools and ad hoc networks.

Information shared and updated may also include that relevant to the current state or members of the network, the data stored on the network and the like. The examples provided describe how to add new nodes to the network, how to synchronize those nodes and typically minimize network impact. Additionally, the examples describe a way to manage updates if nodes leave and then possibly rejoin the network with new data.

The example described can be peer to peer based, also it can scale as additional nodes join the network. Since significantly all data is maintained with the node ID and time values, nodes can join and leave as needed. In the event that a node disappears from the group or swarm, a timer can be used to alert the operator or master that a node is missing, and other methods as needed can be used to find the node and determine why the node was lost through a presence detection process.

The examples below describe a managing a dynamic data pool on ad-hoc networks. Although the present examples are described and illustrated herein as being implemented in a wireless radio system, the system described is provided as an example and not a limitation. As those skilled in the art will appreciate, the present examples are suitable for application in a variety of different types of networked systems.

The "swarm" of nodes that share or provide a "repository" of shared dynamic data. The swarm is a collection of nodes connected via networks, including but not limited to Wireless personal area network ("PAN"), local area network ("LAN"), wide area network ("WAN") and/or the like. The dynamic data pool may be implemented by an application program, with network connectivity provided through programs constructed in a layered structure ("network stack") or the like.

Nodes may join at any time, and nodes may also loose connectivity to the swarm due to coverage or other issues. While the node is last, the swarm's pool of data can be updated, and the isolated node may also be autonomously collecting new data that is relevant to the swarm's shared repository.

The examples below provide methods describing how to rejoin the swarm, synchronize the data repository, and upload new events (detected while away from the swarm). In the examples are described:
    a method for swarm initiation and initialization,
    a method for election of a repository master (and re-election if the master is lost),
    a method of allowing coordinating and resolving multiple masters through a relay mechanism,
    a method for allowing a new node to join, with a way to synchronize the data repository across the nodes,
    a method for node proximity determination that can utilize message hop-count and round-trip delay,
    A method of assigning capability classes to nodes Capability classes may be assigned to node types to indicate node capabilities such as type of service, whether service is available, whether GPS is available or not, and types of sensors and/or software capabilities that can be onboard. Capability classes can be useful in an ad-hoc system where many different types of devices may join. Capability classes may also be utilized in conjunction with an application program to determine if data is available and if so collect data from a node's sensors, monitor site video via a node's cameras, and the like.

FIG. 1 is a block diagram of a single node network 100. In this example a single node 106 becomes master after other nodes are sought out. In this case the swarm 102, includes just one node 106 which is the master. In this example the single node 106 could be a mobile phone user, a police unit equipped with a network capable radio, or a computer with a wireless networking capability. In this situation a conventional network connection may be available, or only partially available. For example the cell phone tower system may only be partially functioning after an earthquake or other natural disaster. Police or fire units may also be deprived of a central dispatch or relay link in such a situation. In a situation such as this a potentially isolated radio would first attempt to find other radios or communications devices and join their network. If no network is available the radio can seek to form its own network, even if it is a network of one for the time being.

The first device, or node, on-site initiates the SWARM (see initialization example below), elects itself as the MASTER, then this master node starts collecting data. The single node is not attached to any swarm since other nodes have not been detected. Once the node is deemed the master the initialize repository process and other master node processes may be applied at this single master node. For example collected data can be committed to the single dynamic data pool repository coupled to the new master, and the version number identifying the updated dynamic data pool may then increment.

Figure 2:
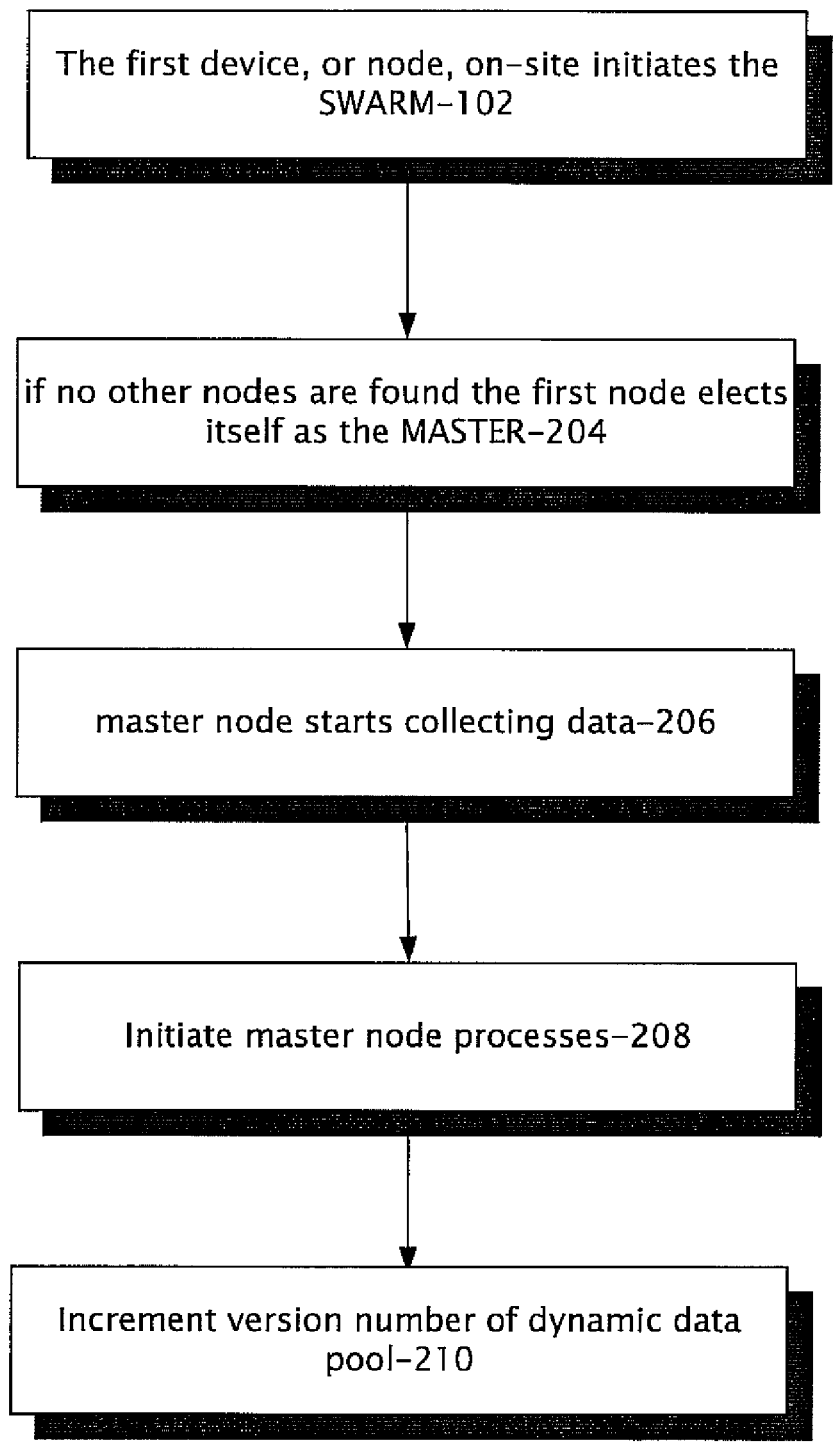
FIG. 2 is a flow diagram of the process for establishing a single node network.

FIG. 2 is a flow diagram of the process for establishing a single node network 200. The first device, or node, on-site initiates the swarm process initiating the establishment of dynamic data pools 202: if no other nodes are found the first node elects itself as the MASTER 204, then this master node starts collecting data 206. Once the node is deemed the master the initialize repository process and other master node processes including collection of data, and the like may be applied at this single master node 208. Finally the version number identifying the updated dynamic data pool may then increment 210.

Figure 3:
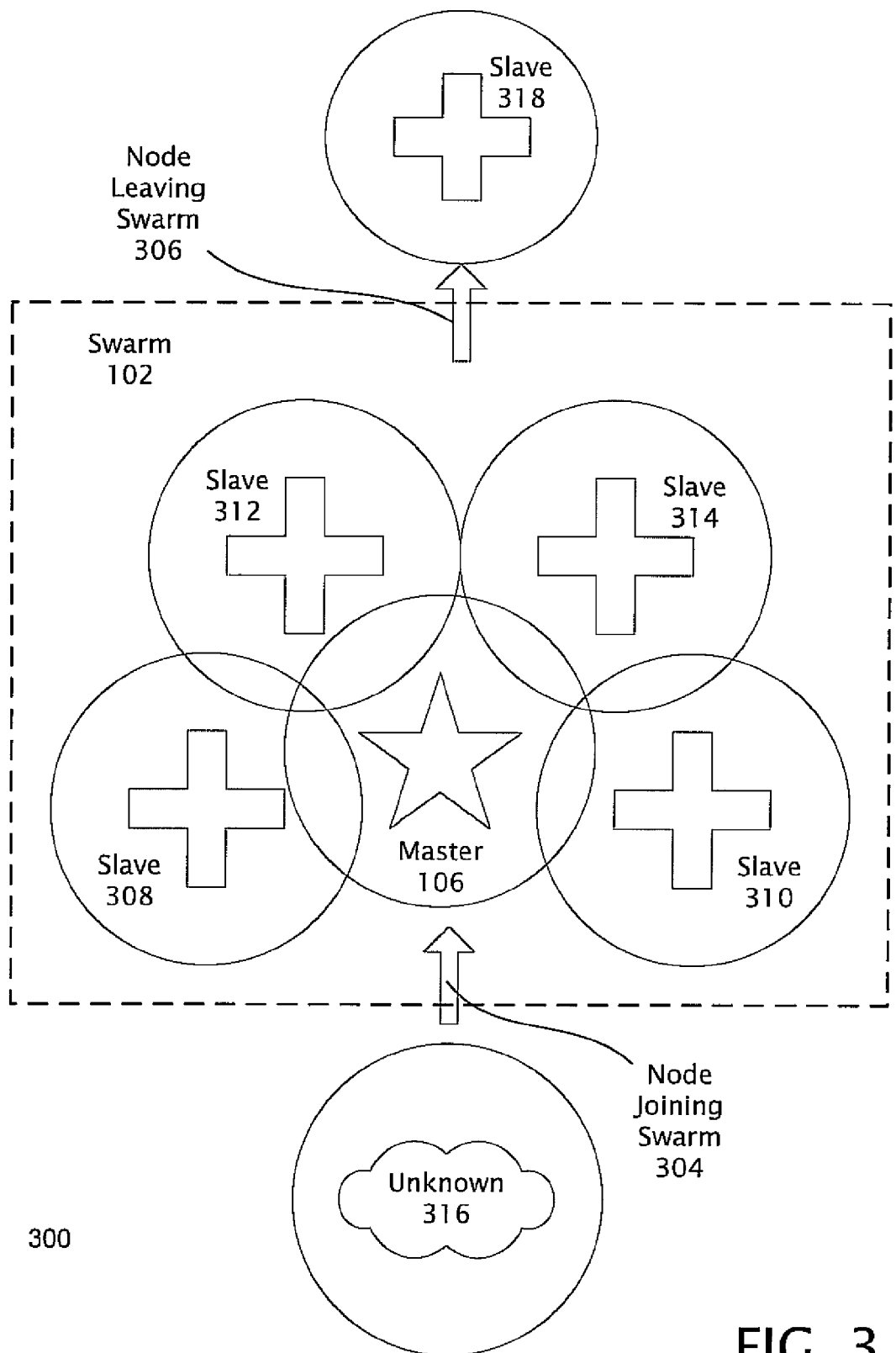
FIG. 3 is a block diagram of a swarm, showing nodes entering and leaving the swarm.

FIG. 3 is a block diagram 300 of a swarm 102, showing nodes entering 304 and leaving 306 the swarm. Building from the case of a single responder 106, the ad-hoc network 102 becomes more complicated if more nodes 308, 310, 312, 314 are present, and if nodes seek to join 304 or leave 306 the ad hoc network 102. Also updating the data repository, (or dynamic data pool) of nodes in the network 106, 308, 310, 312, 314 can done. The data repository may include data storage capabilities of each node, and may be updated, and shared among nodes. Also providing for the cases where nodes seek to join or rejoin the network 316, and the case where nodes may leave the network 318 may be done.

Figure 4:
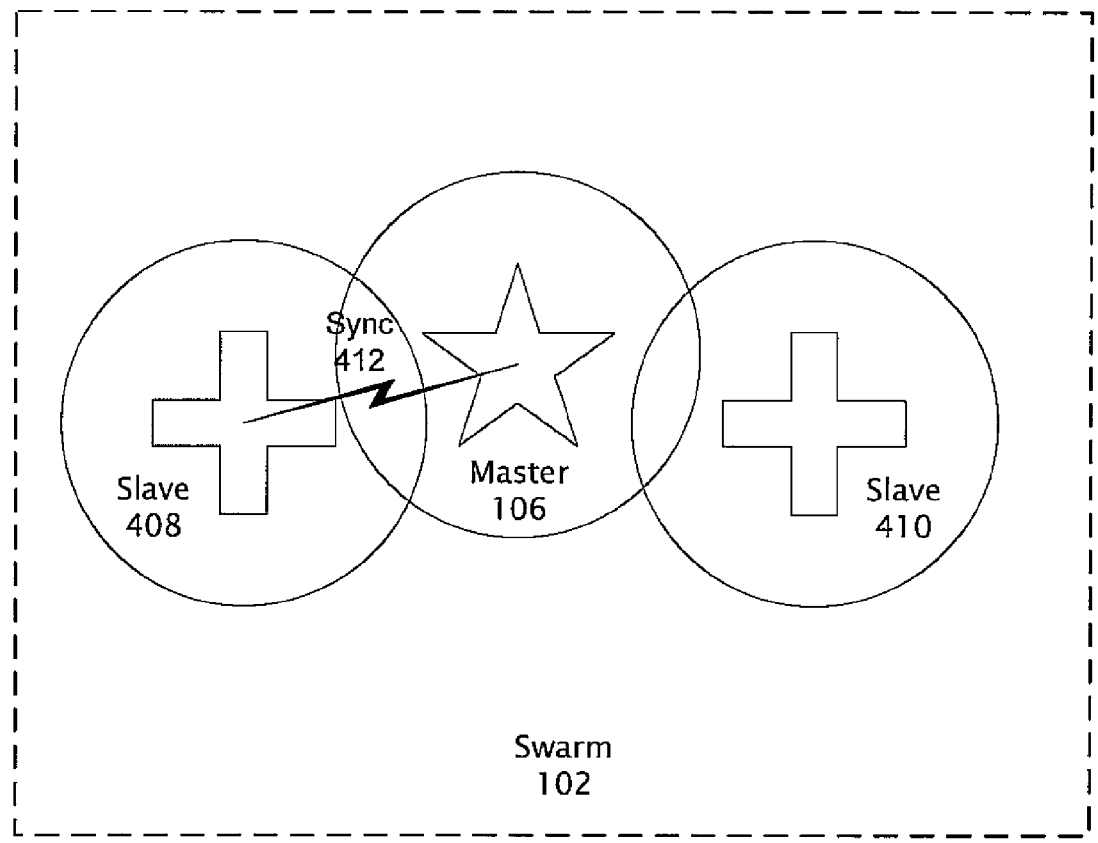
FIG. 4 is a block diagram of a dynamic data pool having a single master node and two slave nodes.

FIG. 4 is a block diagram 400 of a dynamic data pool 102 having a single master node 106 and two slave nodes 408, 410. As the slave nodes join, they attach to current master node once a synchronization signal 412 may be detected. Once joined the nodes 106, 408, 410 gather current data repository information, collect new data, download data and share data.

As more devices move in, they can synchronize to the swarm, and a user interface displayed on a device may show the swarm channels as provided by a SWARM message (described below) or the like. The user of the device selects the swarm ID which can be communicated by the exemplary SWARM_ID message. Then the devices issues exemplary NODE_JOIN messages to indicate that they wish to join the swarm. The swarm master may then allow the new node to join, and start streaming packets to the node to update the nodes local version of the dynamic data pool repository. As additional nodes join in, the swarm is updated, and the nodes synchronize with each other as needed. Data does not necessarily need to flow through the master. Actual data may be shared/streamed from nodes other than the master, provided that relevant metadata for the packets is included.

Figure 5:
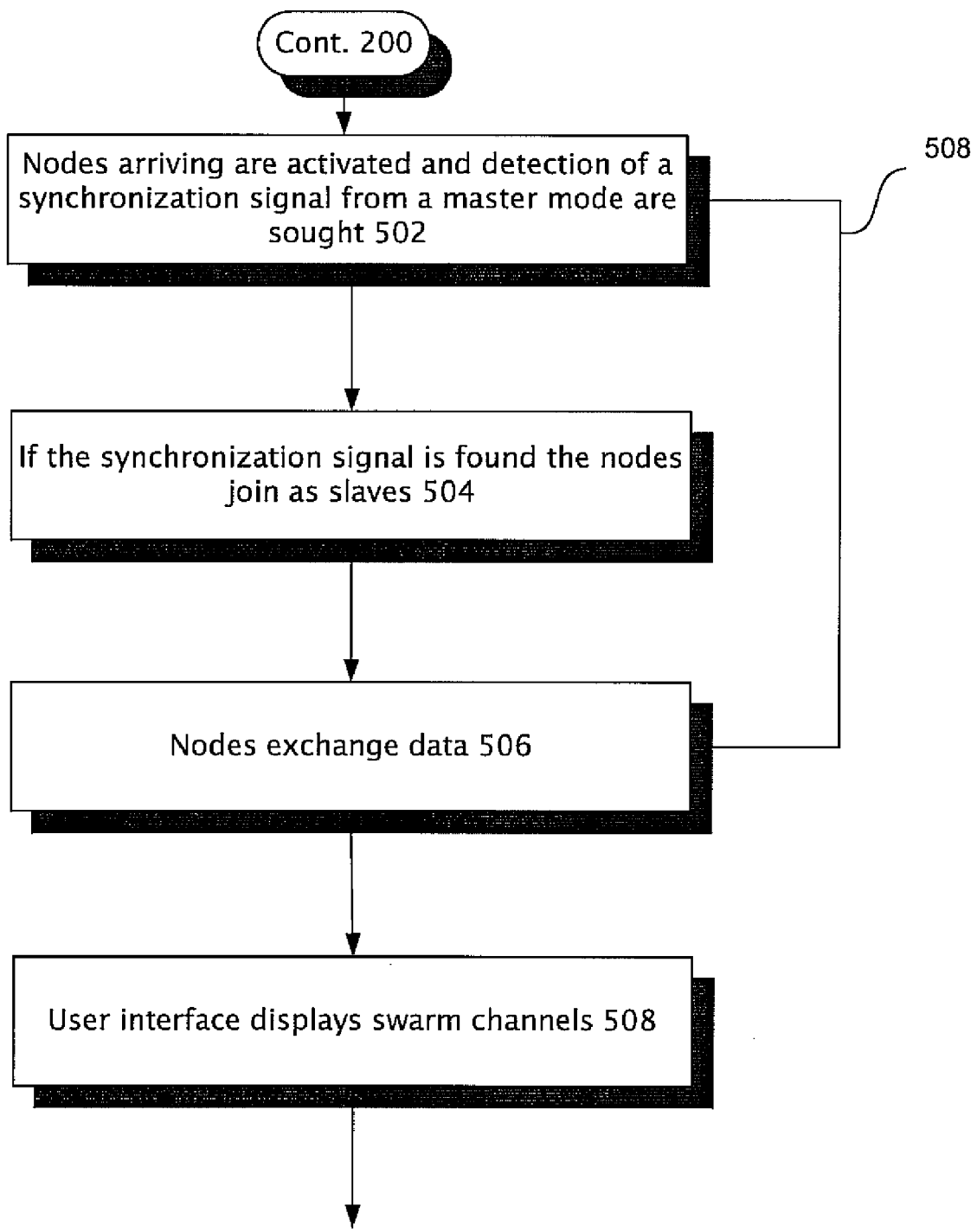
FIG. 5 is a flow diagram of a process for nodes joining a swarm.

FIG. 5 is a flow diagram of a process for nodes joining a swarm 500. This process can continue the process 200. Nodes arriving are activated and detection of a synchronization signal from a master mode is sought 502. If the synchronization signal is found the nodes join as slaves 504. Once joined the nodes gather current data repository information, collect new data, download data and share data and otherwise exchange data 506. As more devices move in, they synchronize to the swarm by repeating the process 508. A user interface may show the swarm channels as provided by the SWARM message 510.

Figure 6:
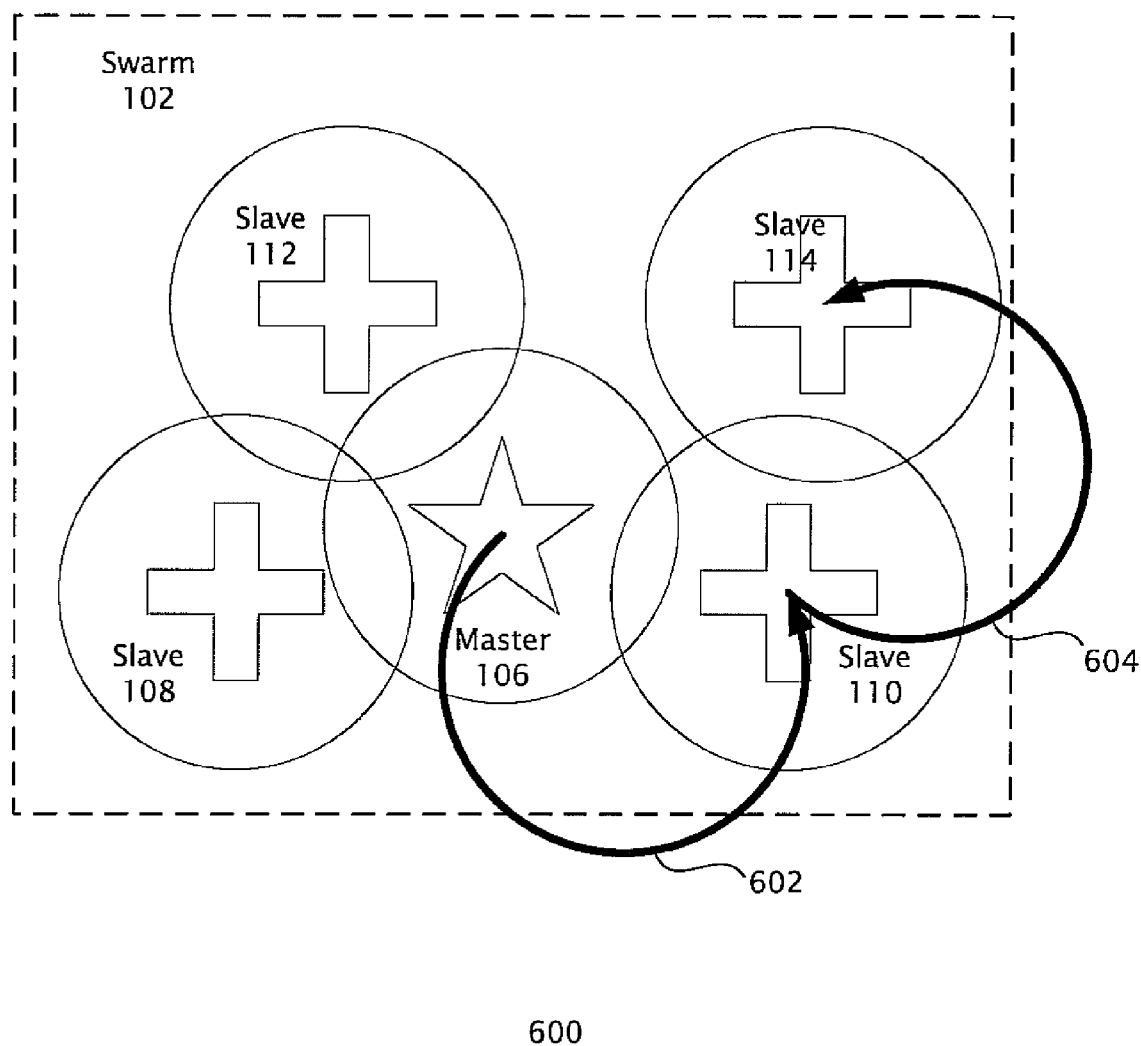
FIG. 6 in a block diagram of a synced swarm of multiple nodes, including hopping.

FIG. 6 in a block diagram 600 of a synced swarm 102 of multiple nodes 106, 108, 110, 112, 114 including hopping 602, 604. Here the swarm 102 has been synchronized and is ready to reconcile data among the multiple nodes by hopping. As the swarm grows, slaves can provide hops 602, 604, by retransmitting synchronization information from master, and relaying data via hops to rest of swarm.

Figure 7:
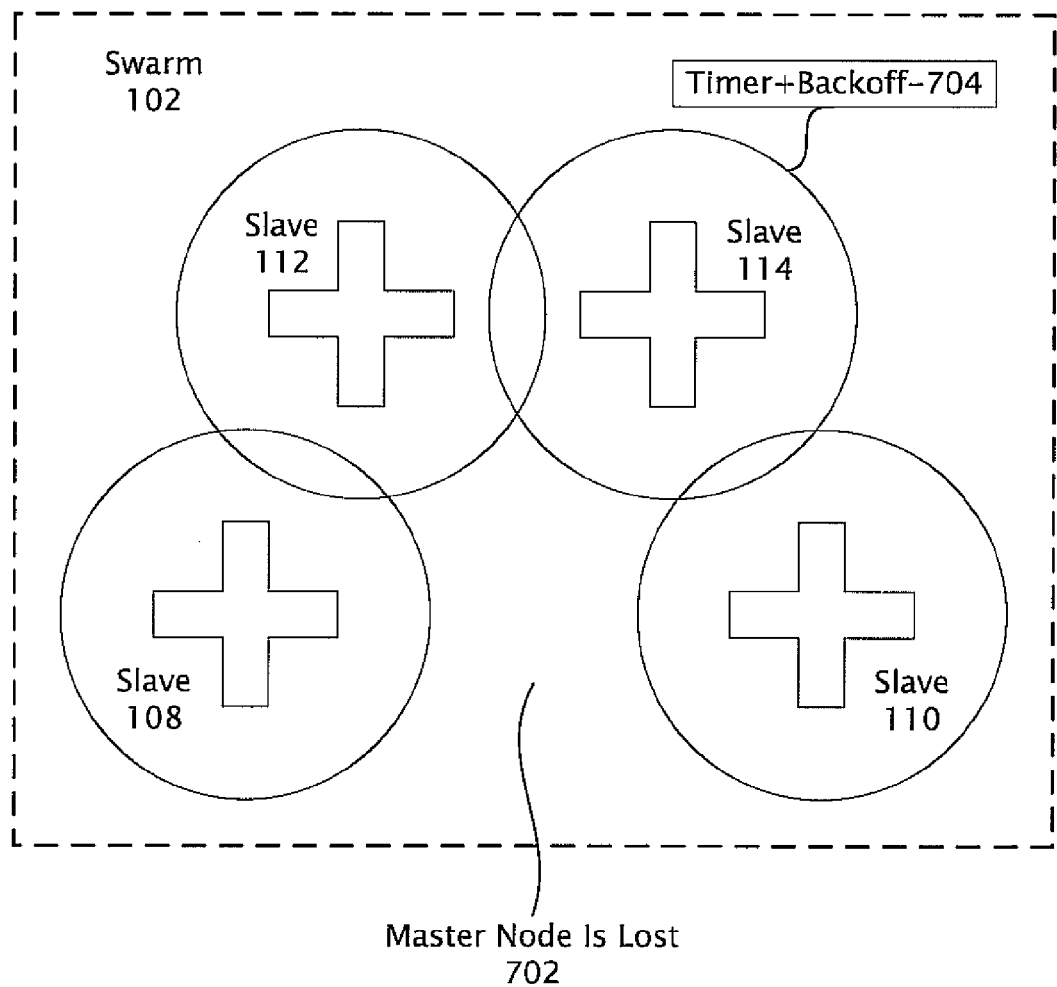
FIG. 7 is a block diagram of a swarm in which the master node has been lost.

FIG. 7 is a block diagram of a swarm 102 in which the master node has been lost 700. Here the master could be lost 702, due to its malfunctioning, It could have moved out of the coverage area of the wireless network or it could be lost for similar reasons. If synchronization is lost from master node, the swarm 102 still exists without breaking up or disbanding. All slaves 108, 110, 112, 114 can set their timers, such as exemplary timer 704, to include a locally generated back off value. Once the timer+the back off value 704 expires, the node 114 starts synchronization process and spins/updates repo minor revision value and starts the master determination processes. As a result of this process one of the remaining nodes becomes the new master. In this example the back off may be needed to prevent contention between slave nodes.

Figure 8:
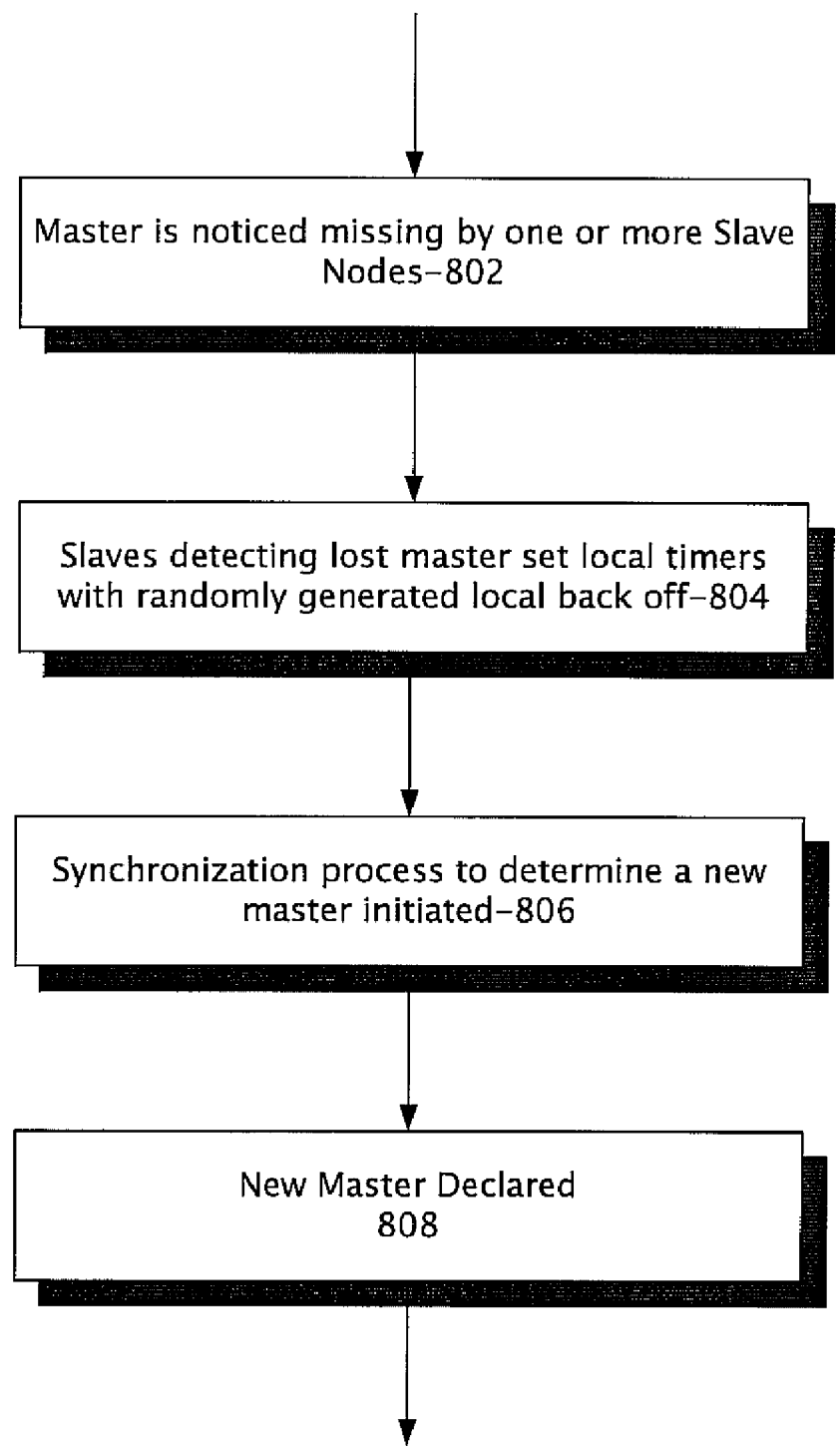
FIG. 8 is a flow diagram of a process for reestablishing a master node after a master has been lost

FIG. 8 is a flow diagram of a process for reestablishing a master node after a master has been lost 800. First the master is noticed to be missing by one or more nodes in the swarm 802. All slaves set their local timers, to include a locally generated random back off value 804. Once the timer+the back off value expire, the node starts synchronization process to determine a new master 806. As a result of this process one of the remaining nodes becomes the new master 808.

Figure 9:
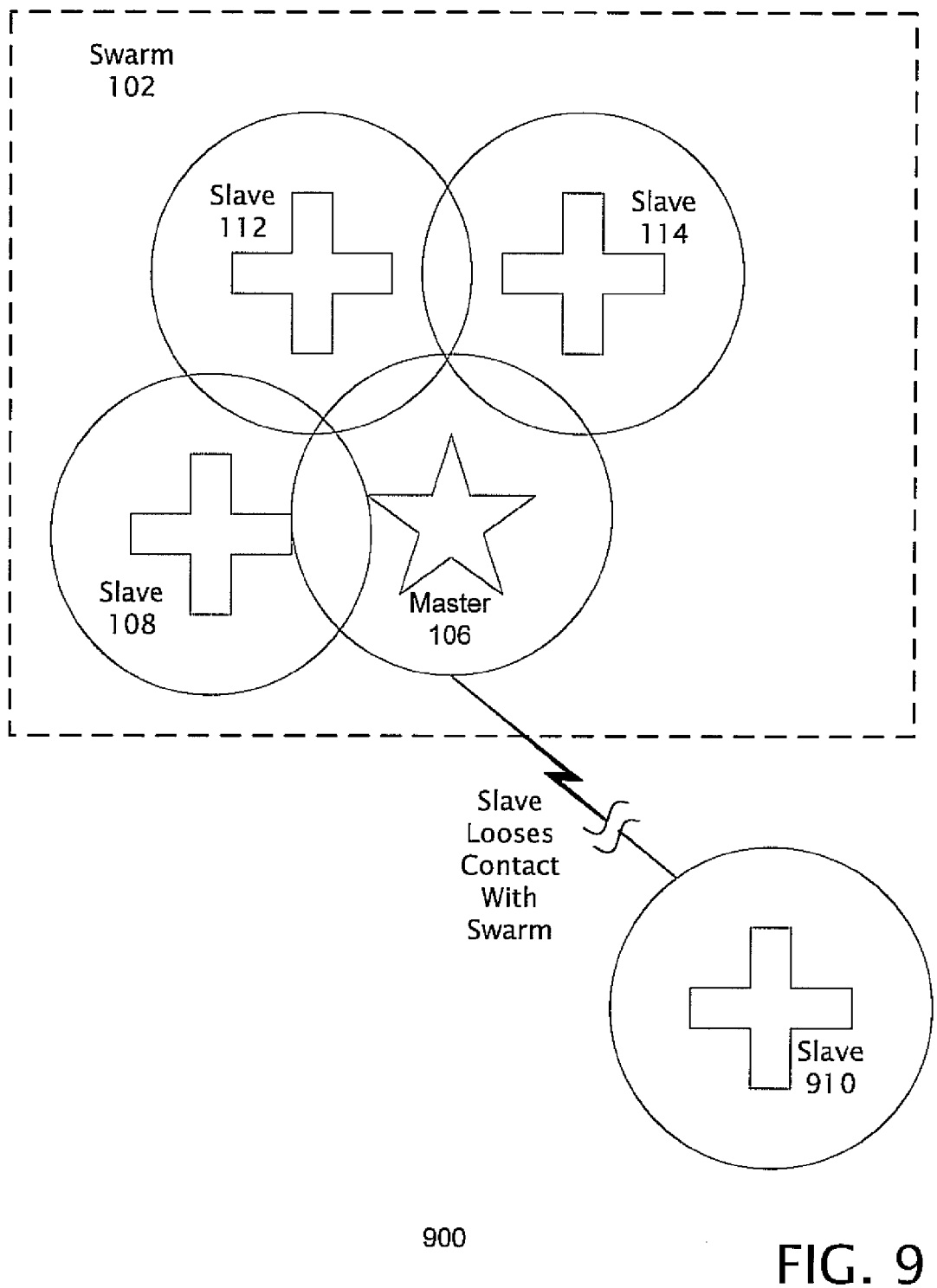
FIG. 9 is a block diagram showing a slave loosing contact with the swarm and becoming a new master.

FIG. 9 is a block diagram 900 showing a slave 910 loosing contact with the swarm 102 and becoming a new master 910. Here the slave 910 loses sync. This previous swarm member (slave node) 910 loses synchronization and contact from the swarm 102. The detached node can initiate a search when it looses contact and, if the swarm 102 is not found, it can go into an initialization process which can result in the separated node 910 transforming its self into a master node.

If a node 910 loses contact with the master 106, it enters a synchronization state, and may initiate its own swarm (not shown), while maintaining the previous ID's and channel settings. This can facilitate establishing a relay mechanism, where a NODE message may detect multiple SWARM message masters. If this occurs, the node enters relay mode, and creates a relay control channel and relay procedures described later.

Figure 10:
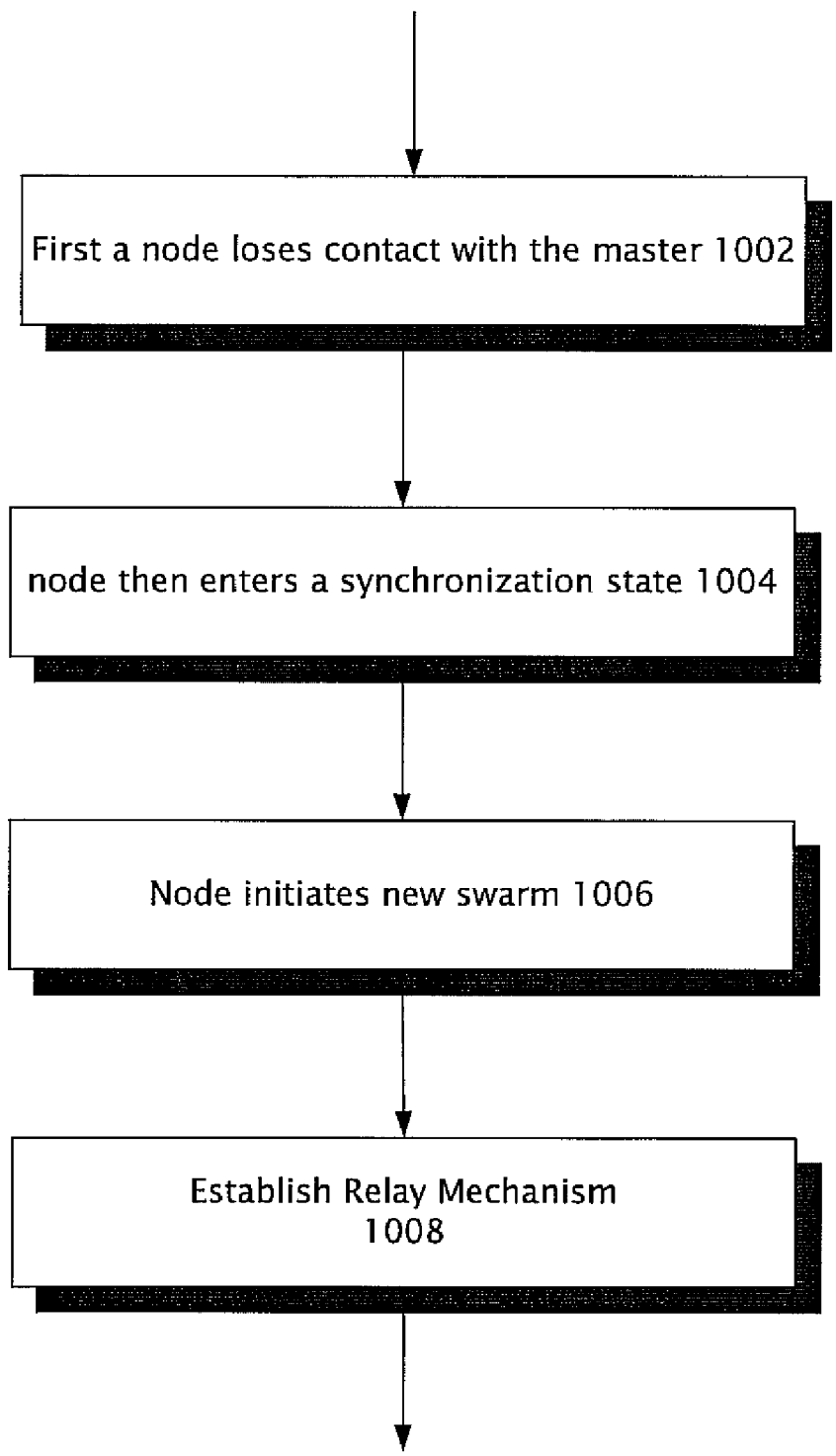
FIG. 10 is a flow diagram of a process for a lost slave becoming a new master.

FIG. 10 is a flow diagram of a process for a lost slave becoming a new master 1000. First a node loses contact with the master 1002. The node then enters a synchronization state 1004, and may initiate its own swarm 10061 maintaining the previous ID's and channels. This facilitates establishing a relay mechanism 1008, where a NODE may detect multiple SWARM masters.

Figure 11:
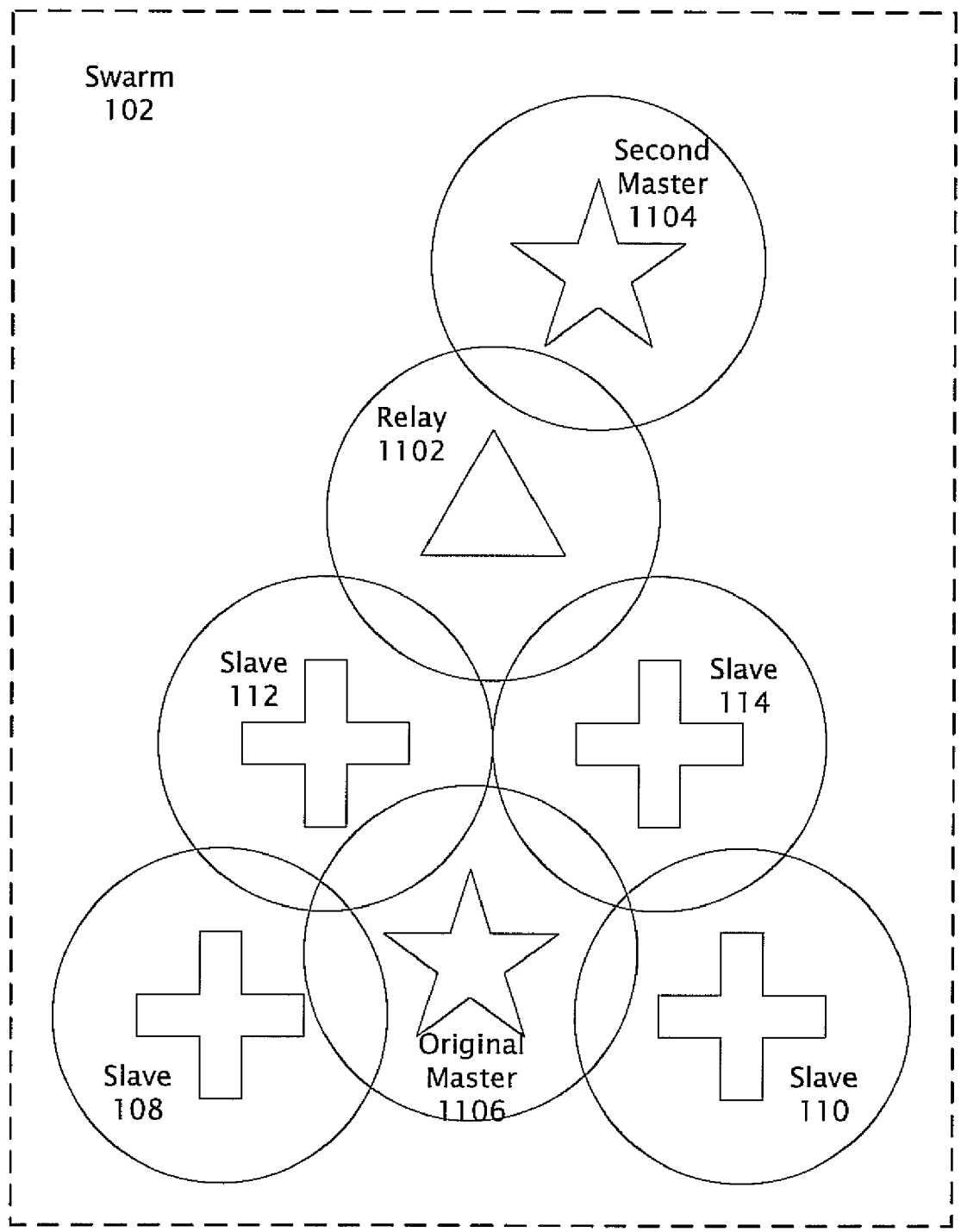
FIG. 11 is a block diagram showing a swarm of nodes including two masters nodes coupled via a relay node.

FIG. 11 is a block diagram showing a swarm of nodes 108, 110, 112, 114, 1102, 1104, 1106 including two masters nodes 1106, 1104 coupled via a relay node 1102. Here a slave 1102 has lost contact with swarm 102 and it has initiated a search for a new master. If a slave detects multiple masters 1106, 1104, the node 1102 enters the relay mode or process. Masters 1104, 1106 can only communicate with slaves 108, 110, 112, 114, as implemented. The creation of relay nodes 1102 facilitates master 1104 to master 1106 synchronization. During operation it may be highly likely that the relay node 1102 will become the new Master of the entire swarm 102. In previous example where master node 1106 was lost, to rejoin the lost node must usually communicate through a relay node to join.

The call flows described above may utilize the exemplary logical channel structures and message formats described below. In implementing dynamic data pools logical channels may be set up. A logical, or virtual channel, can refer to one or more channels that can be communicated over a network. These channels may be encapsulated into data processed by one or more layers of a conventional network stack. Thus several logical channels may be transmitted from one or more layers of a network by encapsulating it prior to transmission. A variety of logical channel structures may be provided to implement dynamic data pools in a network. Exemplary channels are described in the following paragraphs.

Exemplary Logical Channel Structure

Synchronization Channel ("Sync Channel"). A sync channel can be used to sync the swarm. The Sync channel can be periodic, in that the transmission, or polling occurs on a regular basis, more often than other possible control messages. Note that through transmission of the exemplary sync channel a channel list is provided to slave nodes for storage, and updates for new channels in the list can be reflected in comparison of the stored to the received channel lists.

Downlink Control Channel. The downlink control channel can control various functions associated with the downlink. This channel can contain overhead messages for link maintenance, broadcast messages for all nodes, and directed messages for nodes or groups of nodes.

Message Examples

Overhead messages can list data channels, data flows, repository status and the like. Overhead messages are similar to those that can be provided over the sync channel, in that they may be periodic, with no acknowledgment needed from the slave nodes.

Channel List Message—can be similar to messages provided over the sync channel. And, if this message is in the sync channel, it may also be repeated here. The channel list message also contains flows associated with the channel, and the relative priority of those flows The Channel List message can be considered a broadcast overhead message, but may also be classified as an addressed message based on a query from a slave node.

Repo Status Message—contains revision identification ("ID")—if the repository is less than the previously recorded revision ID this indicates a rollback. This message can be a broadcast message. However, alternative examples can provide for queries and responses outside of the overhead.

Control Messages—An event driven message that, requires an acknowledgment.

broadcast control messages—messages broadcast to all nodes.

unicast control messages—direct messages sent to a specific node.

channel control messages—messages that can be used for groups of node but not all nodes.

Uplink Control Channel—defines a channel from node to master for initial and periodic registration, acknowledgment of control messages, node events (node to master, or node to node based on context) and the like.

Registration Message—an initial registration to establish presence, and periodically sent to maintain presence.

Acknowledgment Message—Provides a return of a message ID and a node ID to confirm control messages were received on control channel.

Node Event Message—These messages send notifications, data to master, or other nodes, and request data from master or other nodes.

Bi-Directional Data Channel—Is a channel where payload can be sent to and/or from nodes. Transmission can be master to a slave node, node to node, or the like.

Message Format Examples Below (see Example Message Formats)

Relay Control Channel

As wireless communications are less than robust in maintaining contact between nodes under all transmission circumstances, there can be ample opportunities for portions of the swarm to be isolated, which can cause them to lose sync with the master node. As there are processes provided to establish a new master, it is highly likely that within the larger collective that a slave node may detect another swarm master.

If a node detects two masters, it can establish a relay control channel between the first and second masters. Thus there could be considered to exist two swarms, swarm 1 and swarm 2. This channel can notify the primary master that another version of the repository exists, and to initiate communications between the two masters.

Typically masters only communicate with slaves, and relay nodes. It should also be noted that relay nodes only transmit control messages within the relay control channel, and that the repository management should remain with the respective masters until election and reconciliation of the repositories is started. Once the relay control channel is established, election can occur, and it is likely that the relay node may become the new overall swarm master. This process can facilitate coalescence of a fragmented swarm, and the relay node may be the new master.

Additional Exemplary Messages

Listed below are additional messages that may be utilized by the logical channels: which are presented to show examples of how dynamic data pools can be implemented. The format of the messages listed below are but one example, and should be considered as a single example, out of many that may be possible.

TIMESTAMP—The timestamp message can be synchronized to the swarm master.

SWARM_ID—The swarm ID identifies or designates the ad-hoc network.

NODE_ID—The node ID can designate the actual node value, and may be arbitrary or assigned. (example is MEID, IMEI, ESN, MAC Address, GUID, etc)

VERSION_NUMBER—The version number indicates the current version of the data repository stored (master or slave nodes).

DATA—The data message may be a variable length field for events, join requests, presence, geographic location information, text, audio, video, or similar information.

ROUND_TRIP_DELAY—The round trip delay can indicate the distance to the nearest adjacent node.

SIGNAL_LEVEL—Signal strength may communicate the signal strength of nearest node.

DATA—The data message can either communicate SWARM messages or NODE messages.

SWARM Messages—Swarm messages can be control messages from the elected master of the swarm to other nodes in the swarm.

SWARM_CREATE—The swarm create message initiate creation of the swarm, and may include an implicit or explicit SWARM_ID number where the swarm ID number can be an arbitrary number that designates the swarm SWARM_REPO_CREATE—create the master repository ID SWARM_SYNC—The swarm synchronization message forces synchronization across all visible nodes in the SWARM.

SWARM messages can be transmitted across the nodes, in this event, a hop count can be added, and when retransmitted, the individual nodes shall increment the hop count and identify themselves by providing their NODE_ID.

NODE Messages are messages that can be typically shared across all nodes in the SWARM, and can be used to transmit information.

NODE_JOIN—The node join message can indicate the NODE_ID and SWARM_ID of the swarm that the node wishes to join, the message may also indicate the presence to the swarm of the new node.

NODE_VERSION_REQUEST—Is a message that can be sent to request the current repository version from the master node.

NODE_DATA_REQUEST—The node data request can request information from the SWARM to synchronize packets of information.

NODE_DATA_SUBMIT—The node data submit message may send information committed to the shared data repository.

NODE_DATA_TYPE—The node data type message can indicate if repository data, or other data, such as text messaging, audio, video, and the like is present.

Figure 12:
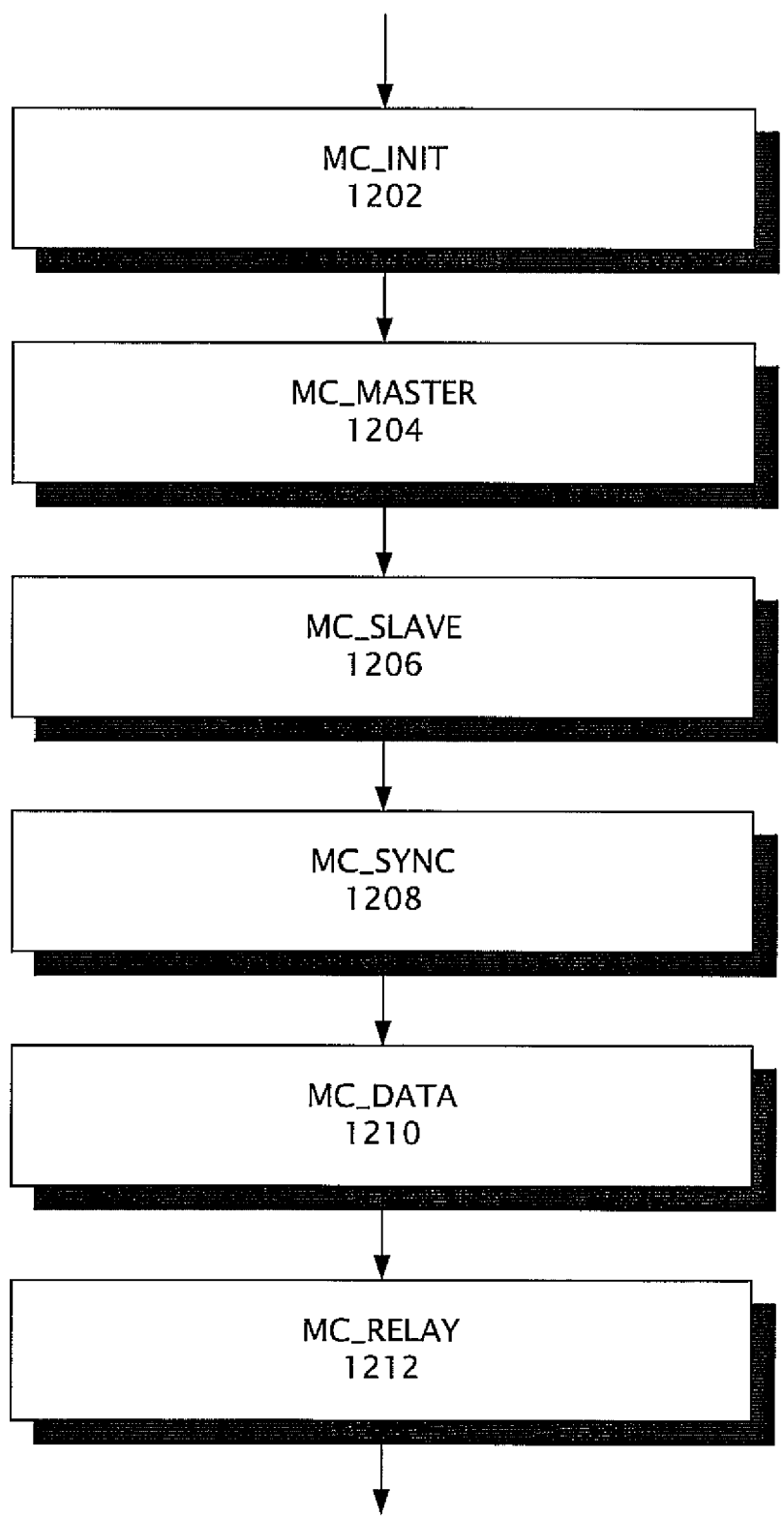
FIG. 12 is a flow diagram of control flow for implementing the event and state machines described previously.

FIG. 12 is a flow diagram of control flow for implementing the event and state machines described previously 1200. As shown a number of processes and sub-processes described above may be grouped together to provide the functionality previously described. The order of the blocks of operations shown by this flow of pseudo code is flexible and may vary depending upon use. Any suitable programming language may be utilized to implement these processes such as C, C#, or the like.

The exemplary processes may include an initialization or, MC_INIT process 1202, followed by a MC_MASTER process 1204, and a MC_SLAVE process 1206. In these three processes an initialization of the radio may be performed 1202, and then if the radio is designated as a slave its registers, channels and the like may be set up appropriately 1204. And at this point monitoring of the synchronization may be performed 1208.

At block 1210 the MC_Data process may be present to process data and synchronize the node with the data store. And finally the MC_RELAY process 1212 may be engaged if an additional master is encountered, such as when another master, or other swarm is encountered.

Figure 13:
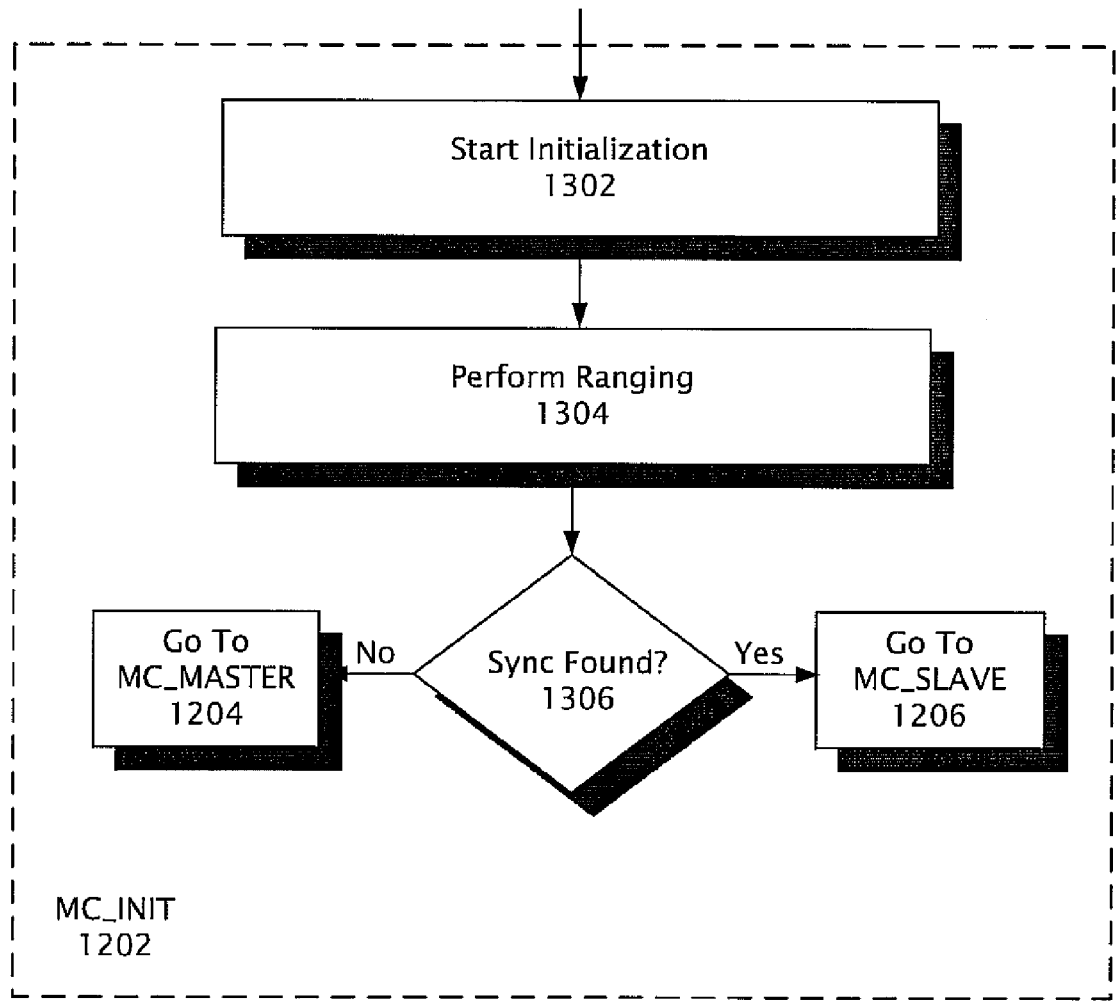
FIG. 13 is a flow diagram of a call flow for MC initialization 1202.

FIG. 13 is a flow diagram of a call flow for MC initialization 1202. The process may be summarized in pseudo code as follows:

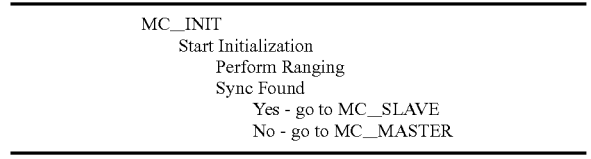

At block 1302 initialization of the radio commences. A ranging process may be performed to determine the radio frequency environment that the radio is in 1304. During this process the radio may seek a synchronization signal 1306. If the radio finds a synchronization signal, that is an indication that a master node is already present and the radio may initiate the MC_SLAVE process 1206 to configure the radio as a slave node. If synchronization is not found then that is indicative that a swarm is not present and the node can establish itself as a master through the MC_MASTER process 1204.

Figure 14:
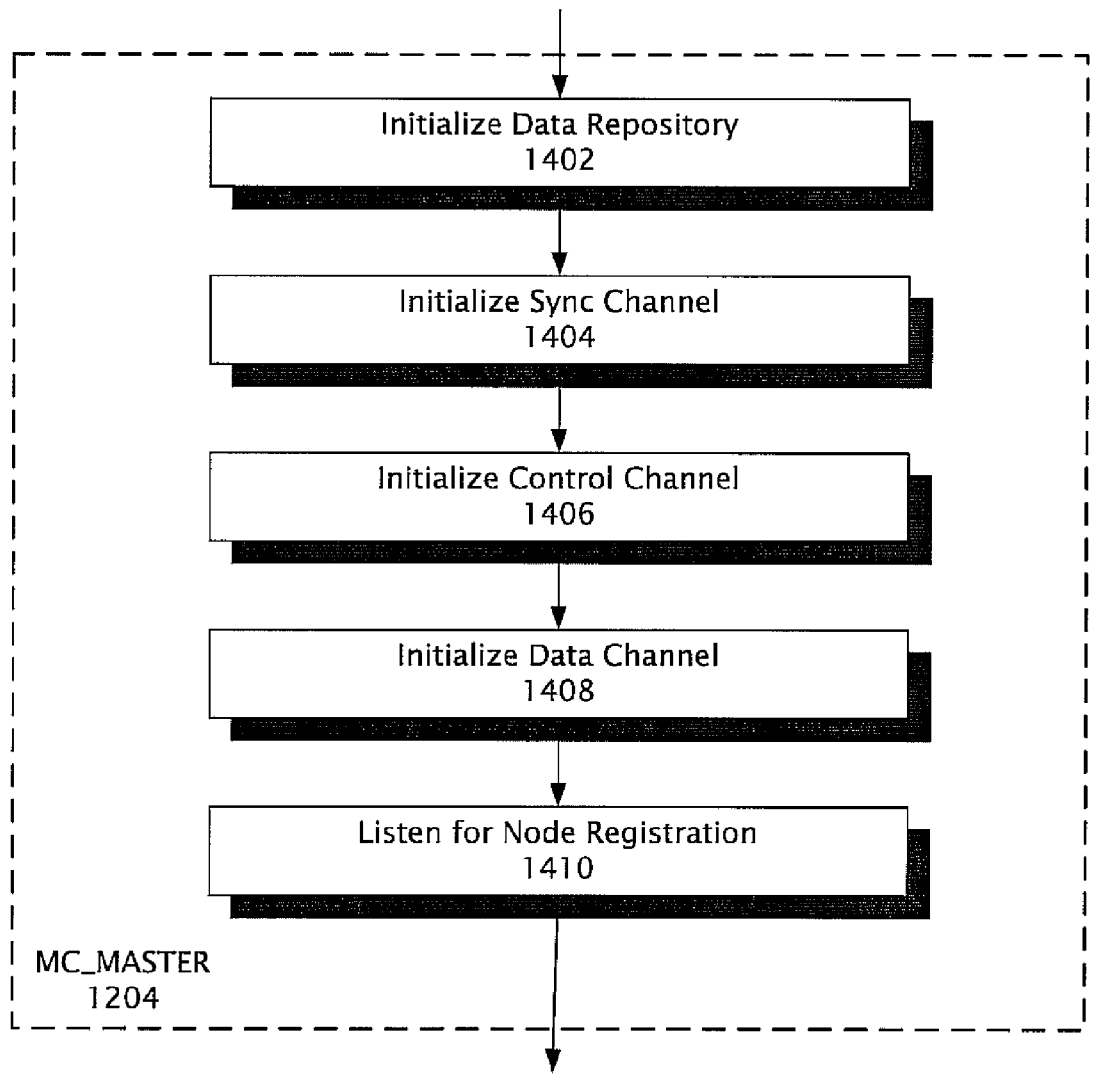
FIG. 14 is a flow diagram of a call flow for MC Master 1204.

FIG. 14 is a flow diagram of a call flow for MC master 1204. The process may be summarized in pseudo code as follows:
MC_MASTER
   Initialize Data Repository
   Initialize Sync Channel
   Initialize Control Channels
   Initialize Data Channels
   Listen for Node Registration In setting up a master node several operations may be performed. First a data repository may be initialized 1402, and then a sync channel (previously found at 1306 of FIG. 13) may be initialized 1404. Next a control channel may be initialized 1406, as well as a data channel 1408. At this point the process may finally go into listening mode to determine if the radio has been registered as a node.

Figure 15:
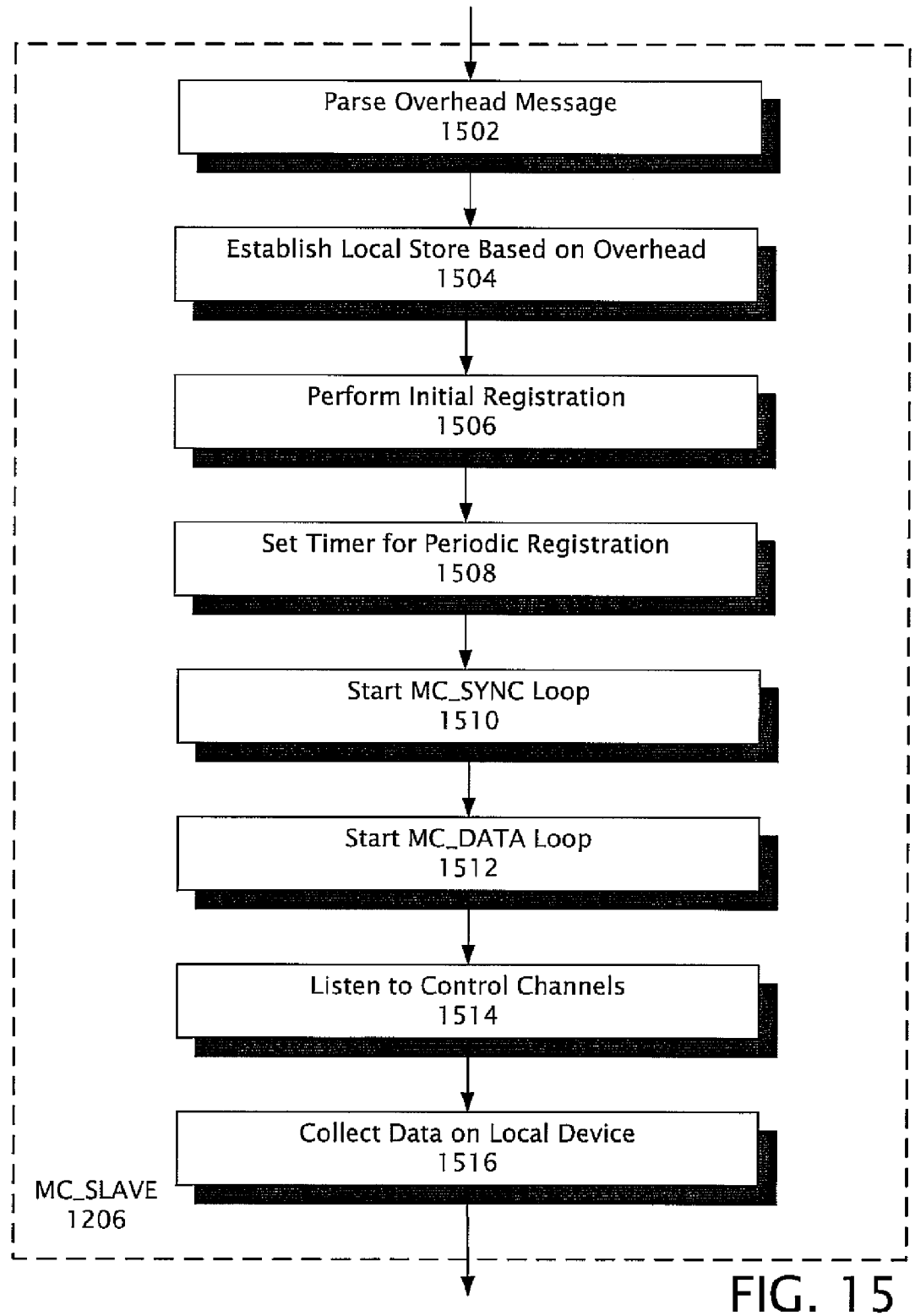
FIG. 15 is a flow diagram of a call flow for MC synchronization 1206.

FIG. 15 is a flow diagram of a call flow for MC slave 1206. The process may be summarized in pseudo code as follows:

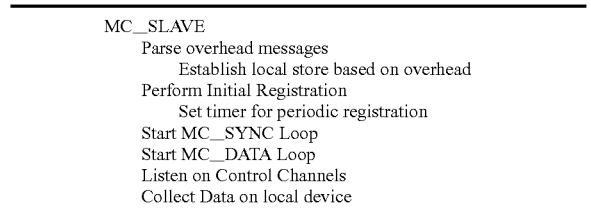

In this process the radio node may be configured as a slave node. At block 1502 an overhead message may be parsed. Based on the network overhead message a local store based on the overhead message may be created 1504. Initial registration of the slave node may be performed 1506. At block 1508 a timer may be set to periodically set registration.

At block 1510 the MC_SYNC loop may be entered to monitor synchronization 1510. Also a MC_DATA loop process may be initiated to control the data flow to and from the node 1512. At this point the control channels may be monitored 1514, and data may be collected by the local device 1516.

Figure 16:
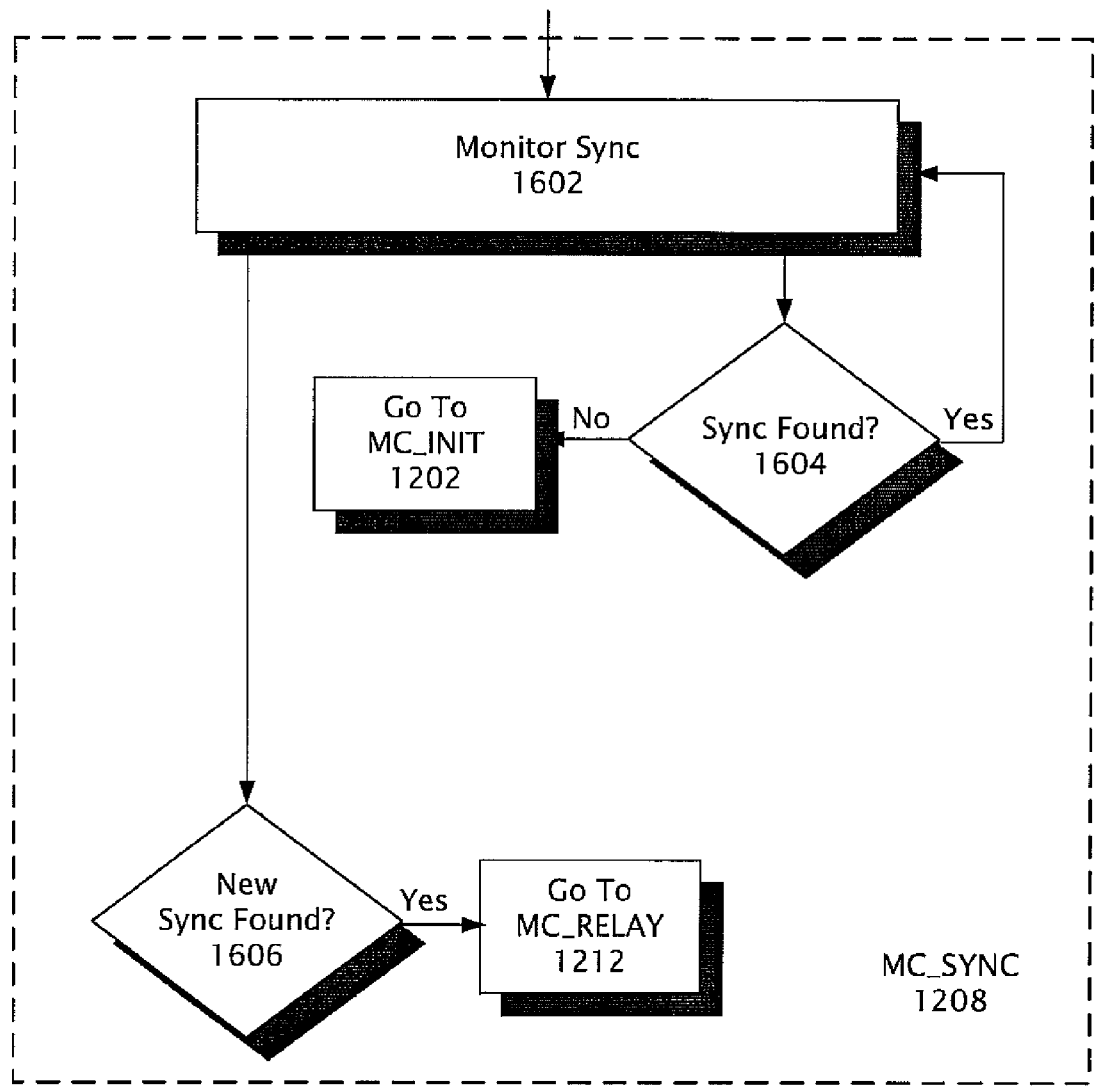
FIG. 16 is a flow diagram of a call flow for establishing a relay node 1208.

FIG. 16 is a flow diagram of a call flow for establishing MC sync 1208. The process may be summarized in pseudo code as follows:

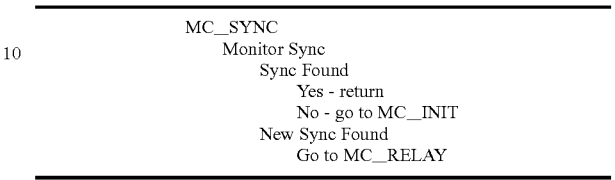

In this process the sync signal is monitored 1602. If synchronization is found 1604 then the process loops back to block 1602 where synchronization continues to be monitored. If no synchronization signal can be found the process goes to MC_INIT 1202 to initialize the node. The process 1602 also monitors for other synchronization signals. If a new synchronization signal is found 1606, then the process enters the MC_Relay process 1212 to establish a relay node.

Figure 17:
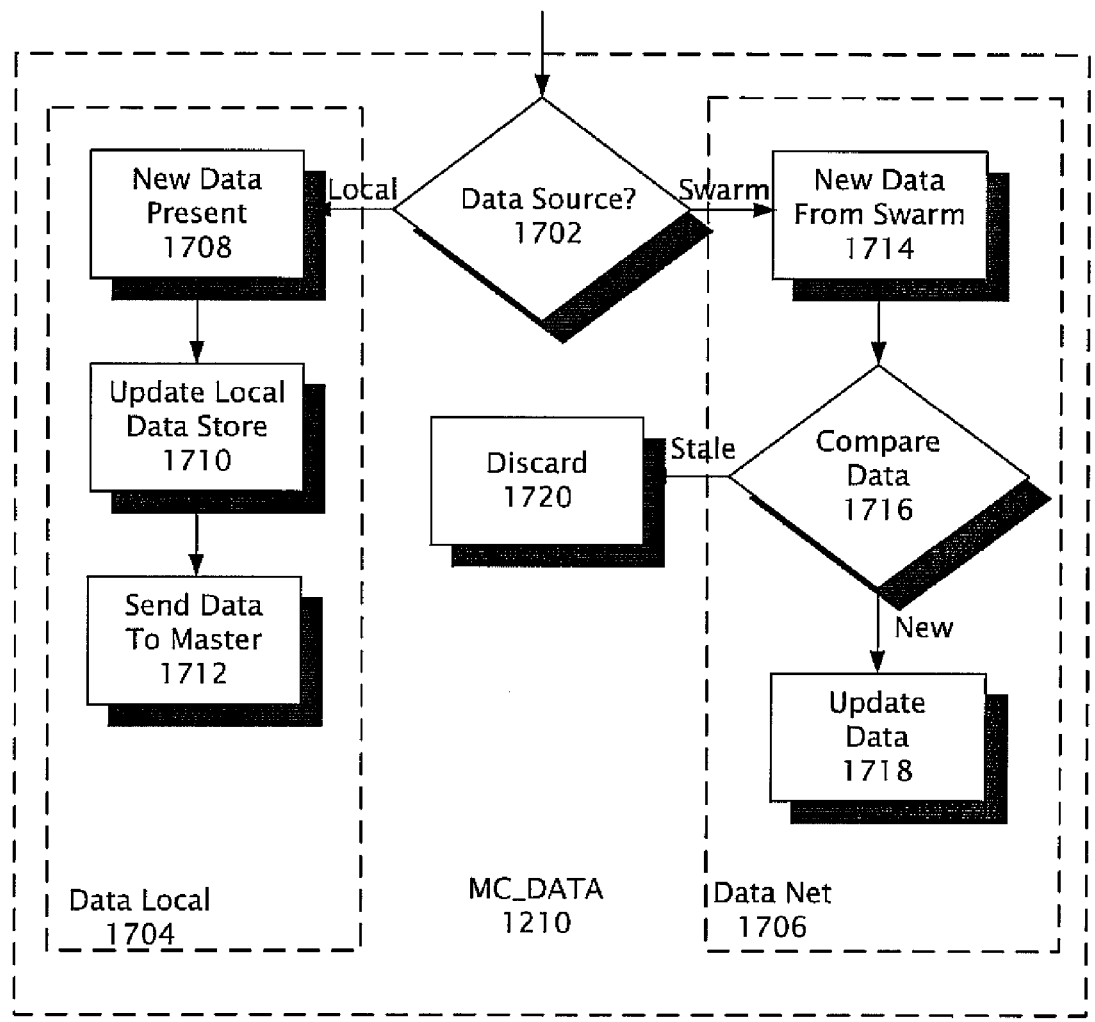
FIG. 17 is a flow diagram of a call flow for MC data 1210.

FIG. 17 is a flow diagram of a call flow for MC data 1210. The process may be summarized in pseudo code as follows:

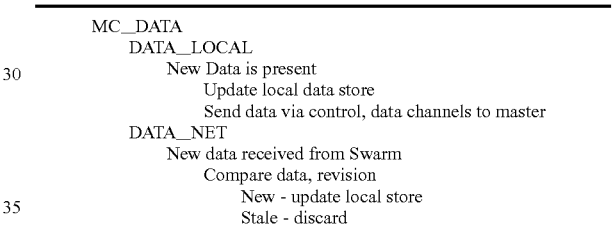

As shown the data store may be evaluated in this process. First a determination may be made to see if the data is from a local source or the swarm 1702. If the data is local 1704 the process determines if the data in the store is new 1708. If new the local data store may be updated 1710, and the new data may be sent to the master 1712. If the data is from the swarm 1706 new data may be accepted 1714. Data from the swarm may be compared by content, revision identifier or the like 1716. If the data is new the local data store may be updated 1718. If the data is found to be stale it may be discarded 1720.

Figure 18:
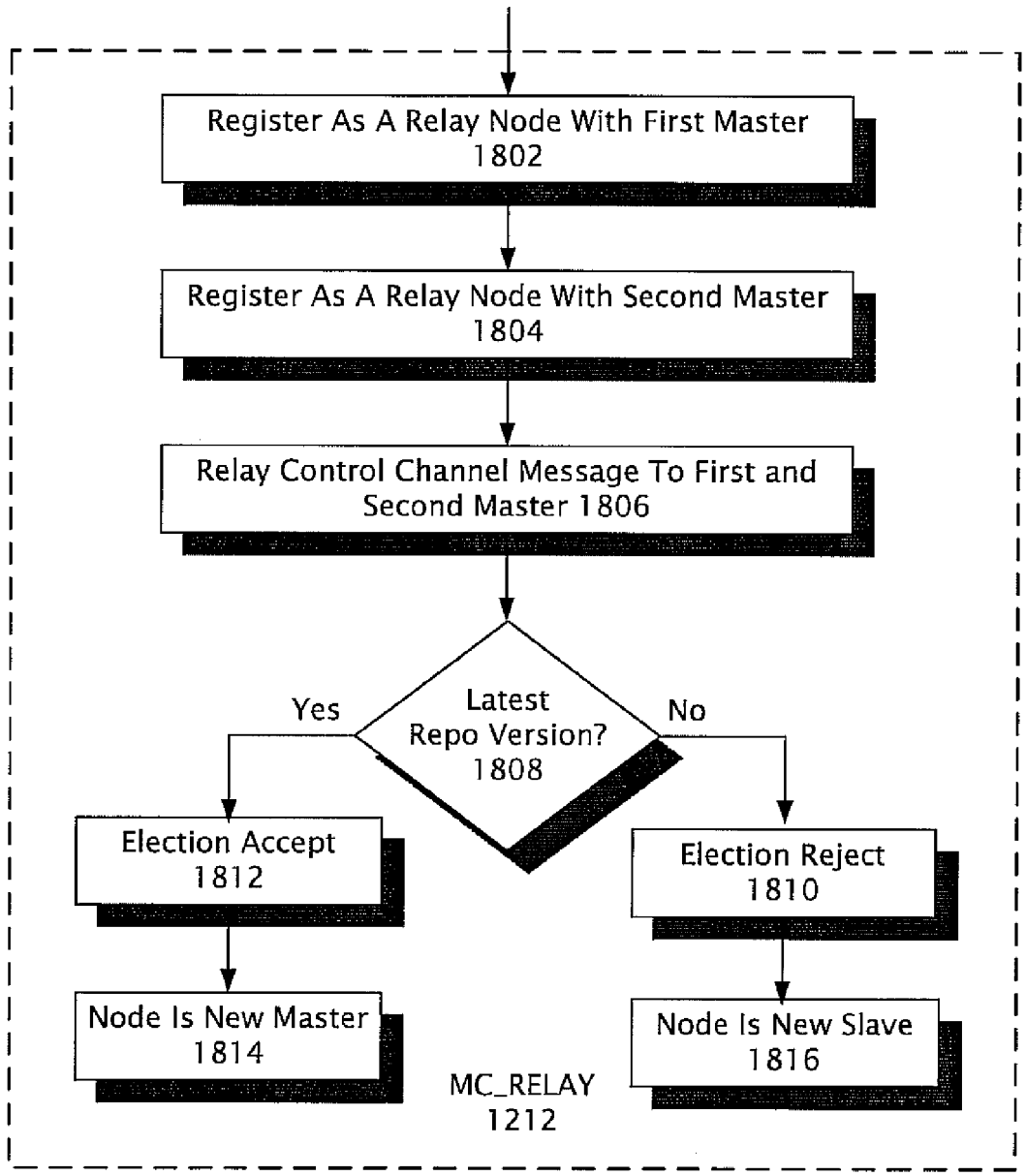
FIG. 18 is a flow diagram of a call flow for MC relay 1212.

FIG. 18 is a flow diagram of a call flow for MC relay 1212. The process may be summarized in pseudo code as follows:

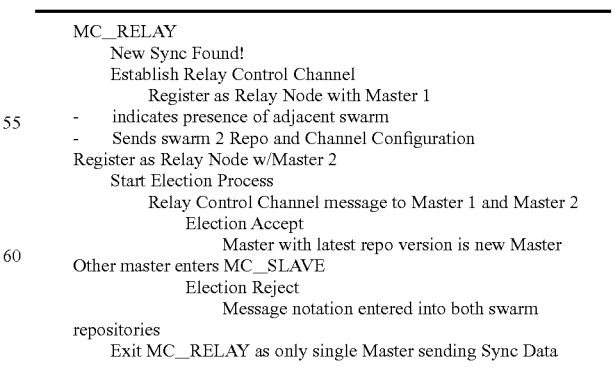

This process may serve to establish and manage a relay node previously discussed when a new sync may be found.

The new node may register with a relay node with a first master 1802, and a second master 1804 by establishing a relay control channel.

Registration can indicate the presence of an adjacent swarm when the first master is registered. The first master may send the second master second swarm Repo and Channel Configuration messages. The node also registers with the second swarm as a relay node.

A contention process as described below, or its equivalent may be used determine which node will become the master, and which the slave. For example the latest repository versions may be compared 1808. The master with the latest repository version accepts election 1812, and becomes the new master 1814. The node with the older repo version may reject election 1810, and become a slave node 1816.

Figure 19:
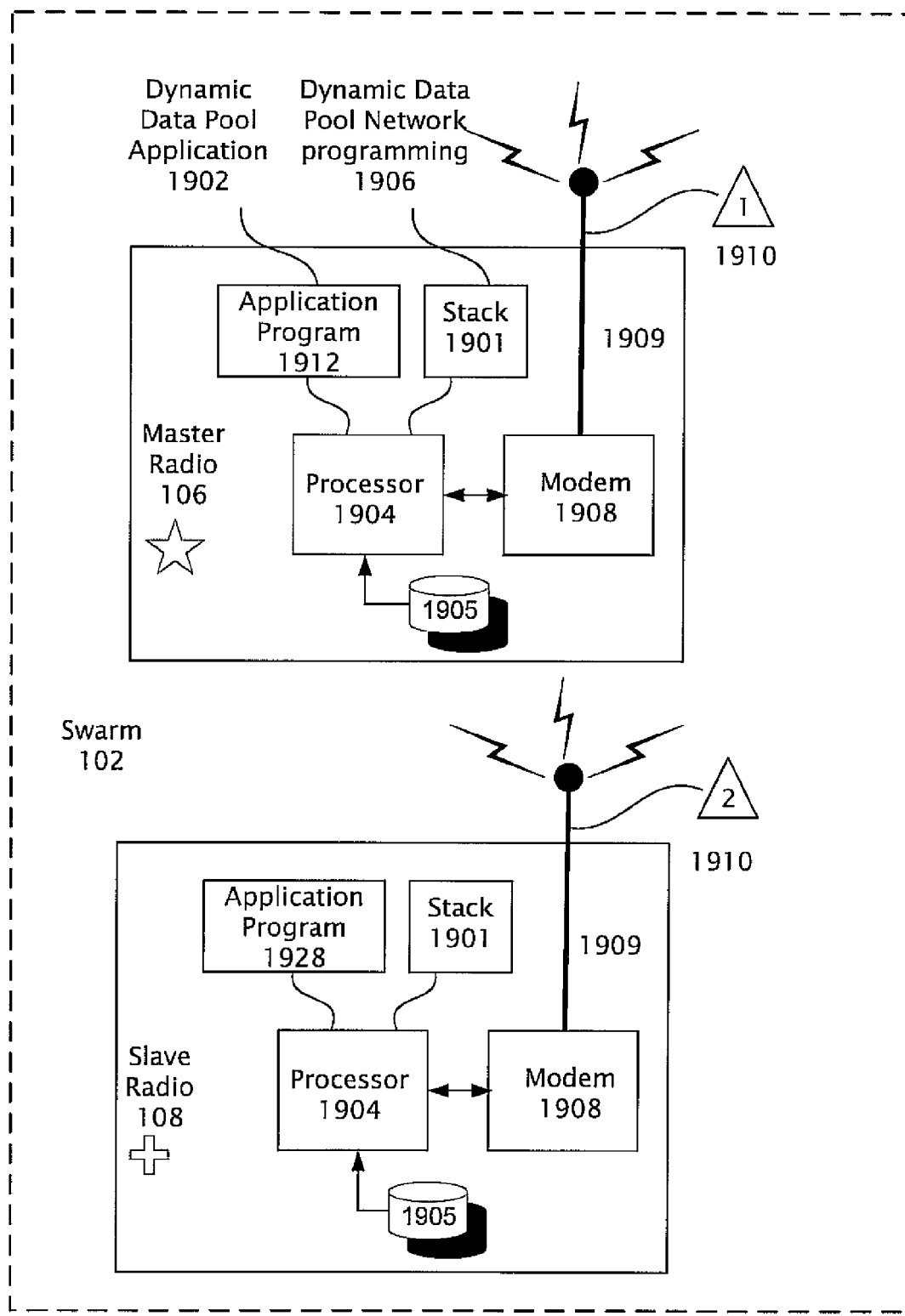
FIG. 19 is a block diagram showing a typical radio network utilizing dynamic data pools.

FIG. 19 is a block diagram showing a typical radio network utilizing dynamic data pools 1900. The examples of radio systems, or swarm radios, 106, 108 that form nodes (master and slave respectively) implementing a dynamic data pool of data bases 1905 may include a conventional applications processor and/or a conventional communications processor(s) 1904, a network stack (or layered programming structure) implementing dynamic data pools 1906, an optional conventional GPS receiver, or various conventionally constructed sensors (not shown), an application program for controlling the dynamic data pools 1902 that can include a user interface for interactivity and presence information, and a conventional data base 1905 to track the repository data. In addition, a conventionally constructed secure element (not shown) may be used to establish and maintain trust across the swarm 102, and to prevent rouge devices from joining, corrupting, or performing denial of service attempts against the swarm. The processors 1904 may be coupled to a modem 1908 for transmitting packetized signals 1910 via a conventional antenna 1909 over a wireless or other type of network.

During an emergency, service personnel in a first responder role may use an example of this invention. Systems that may implement this invention may include biological, chemical, and/or radiological sensing stations, terminals or the like, any combination to the user through a user interface. Other exemplary applications for dynamic data pools and ad-hoc networks as noted above, may also include telematics, 'flashmobs' and other social network applications, or the like where communications may be 'disrupted' due to network differences, congestion, and the like. In alternative examples provision can be made to enumerate device capabilities of these various devices. Although the hardware may be conventionally constructed, the network stack (or layered programming structure) implementing dynamic data pools 1901 and the an application program for controlling the dynamic data pools 1912 can be constructed as described below to carry out the implementation of dynamic data pools.

A computer network is typically an interconnection of a group of computers facilitated by computer programming typically implemented in a layered structure. The four layer Internet Protocol Suite model is an example. The seven-layer Open Systems Interconnection (OSI) reference may also be popular. A number of networks use the Internet Protocol ("IP") Suite as their network model, however the seven layer (Application, Presentation. Session, Transport, Network, Data Link, and Physical Layers) OSI model or the like, may be equivalently substituted for the four layer (Application, Transport, Network and Data Link Layers) IP model. In further alternative examples different networking program structures may be provided that provide equivalent interconnection capabilities in a computer network. The exemplary dynamic data pool described above may be implanted in such a stack that may couple to an application program for providing dynamic data pool functionality.

Figure 20:
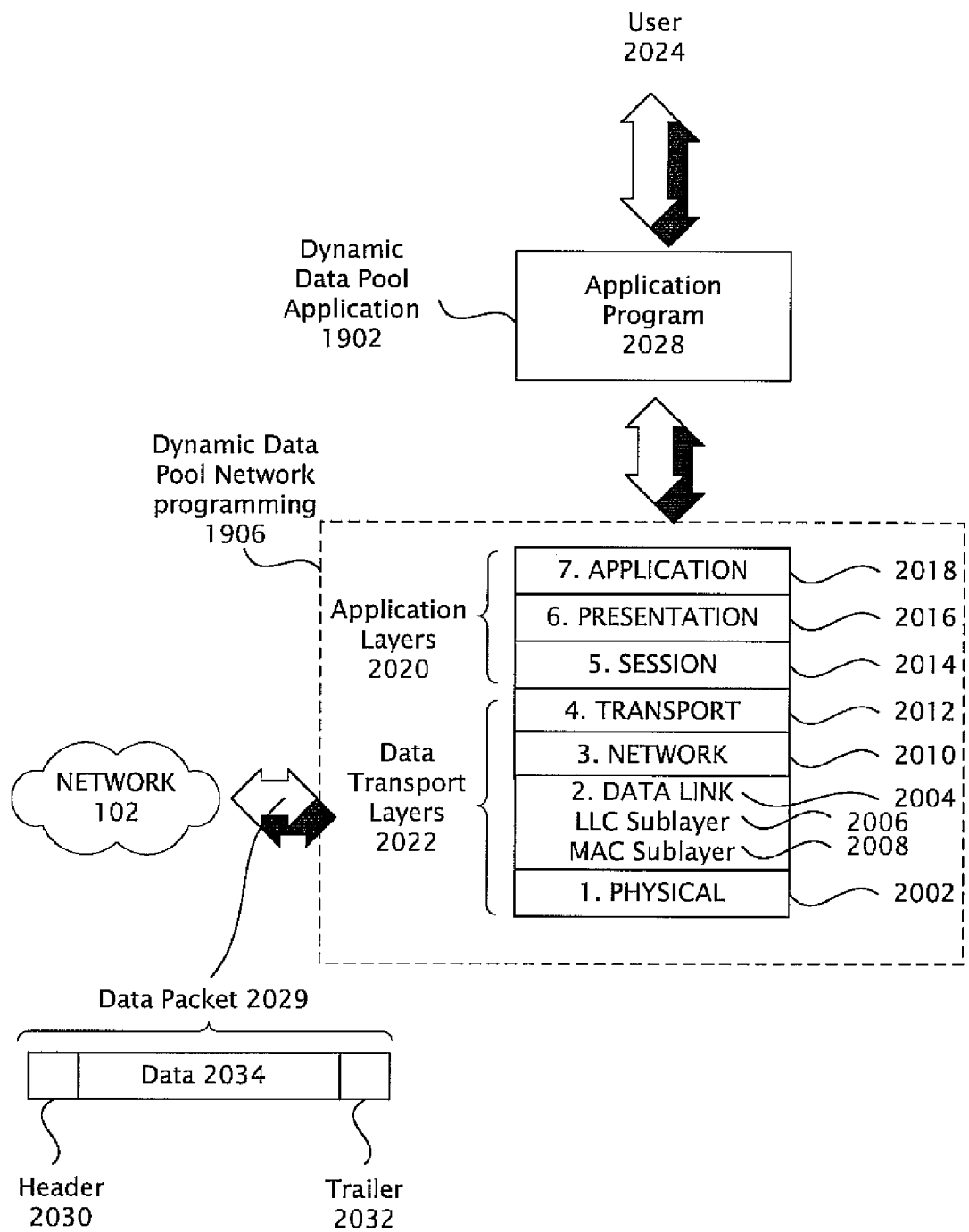
FIG. 20 shows an exemplary layered programming structure ("stack") that can be utilized in providing networking capabilities to implement dynamic data pools.

FIG. 20 shows an exemplary layered programming structure ("stack") 1706 that can be utilized in providing networking capabilities to implement dynamic data pools. Application programs 2018 typically do not couple directly to a network 102. They may often couple to a network 102 through a layered programming structure 1906 that can facilitate networking, without placing undue programming burdens on the application program 2018. Each layer 2002, 2004, 2006, 2008, 2010, 2012, 2014, 2016, 2018 can be written somewhat independently for a particular network implementation which, also tends to simplify providing software networking functions.

The exemplary Open Systems Interconnect ("OSI") model 1906 is an exemplary abstract description for communications and computer network protocol design. The OSI model describes how information from a software application 2018 in one computer moves through a network medium 102 to a software application in another computer (not shown).

The OSI model 1906 divides tasks involved with moving information between networked computers into smaller, more manageable task groups arranged in layers 2002, 2004, 2006, 2008, 2010, 2012, 2014, 2016, 2018. In general an OSI transport layer 2002, 2004, 2006, 2008, 2010, 2012 is generally capable of communicating with three other OSI layers, the layer directly above it, the layer directly below it, and its peer layer in another computer that it is coupled to. Information being transferred from a software application 2018 in one computer system to a software application in another (not shown) must usually pass through the application layers 2020 to the transport layers 2022 where it may be readied for transport, before actual transfer occurs.

A task or group of tasks can be assigned to each of the OSI or other type of stack's layers 2002, 2004, 2006, 2008, 2010, 2012, 2014, 2016, 2018. Each layer can be set up to be reasonably self-contained so that the tasks assigned to each layer can be implemented independently to implement a dynamic data pool on an ad-hoc network. Layering also enables the tasks implemented by a particular layer to be updated without adversely affecting the other layers. The exemplary OSI model 1906 can be structured in layers that can include an:

1. Application layer 2018;
2. Presentation layer 2016;
3. Session layer 2014;
4. Transport layer 2012;
5. Network layer 2010;
6. Data Link 2004; and a
7. Physical layer 2002.

A layer can be a collection of related functions that provide services to the layer above it, and is provided with services from the layer below it. The listed layers and functions are exemplary only. For example more or fewer layers may be provided as desired, and the functions of the layers may vary depending upon the application such as implementing dynamic data pools on an ad-hoc network.

The application layers 2020 may be in communication with an application program 2028. An application program can be provided to include or establish a user interface for dynamic data pools on an ad-hoc network 1902 and to otherwise monitor and control the system as desired. To communicate information from, or regarding, the application program 2028 the application layer 2020 can generate information units 2034 that may be passed to one or more of the data transport layers 2022 for encapsulation 2029 and transfer across the network 102. Each of the three uppermost transport layers 2004, 2010, 2012 can generate its own header 2030, trailer 2032 and the like to pass information units and data 2034 generated from above across the network 102. The lowest transport layer, the physical layer 2002 simply transports data from one or more of the higher layers 2004, 2006, 2008, 2010, 2012, 2014, 2016, 2018 and does not generate its own header, trailer or the like.

1. The Physical layer 2002: The physical layer is typically hardware and software which can enable the signal and binary data transmission (for example cable and connectors). Definition provided by the physical layer can include the layout of pins, voltages, data rates, maximum transmission distances, cable specifications, and the like.

In contrast to the functions of the adjacent data link layer 2004, the physical layer 2002 primarily deals with the interface of a device with a medium, while the data link layer 2004 is concerned more with the interactions of two or more devices with a shared medium.

2. The Data Link layer 2004: The Data Link layer 2004 is typically software and hardware which can provide physical addressing for transporting data across a physical network layer 2002. Different data link layer specifications that may be implemented in this layer can define different network and protocol characteristics, including physical addressing, network topology, error notification, sequencing of frames, and flow control. Physical addressing in this layer (as opposed to network addressing) can define how devices are addressed from this data link layer 2004. Network topology consists of the data link layer specifications that often define how network devices are to be physically connected, such as in a bus topology, ring topology or the like. The data Link layer 2004 can provide the functional and procedural means (headers and trailers) to transfer data between network entities, and to detect and possibly correct errors that may occur in the physical layer 2002. This layer 2004 may be divided into two sub layers 2006, 2008 if desired:

The Logical Link Control ("LLC") Sub-layer 2006 can refer to the highest data link sub-layer that can manage communications between devices over a single link of a network.

Media Access Control (MAC) sub-layer 2008 can refer to the lowest data link sub-layer that can manage protocol access to the physical network medium 102. It determines who is allowed to access the medium at any one time.

3. The network layer 2010 can provide path determination and logical addressing. The network layer 2010 may define the network address (different from the MAC address). Some network layer protocols, such as the exemplary Internet Protocol (IP) or the like, define network addresses in a way that route selection can be determined. Because this layer 2010 defines the logical network layout, routers can use this layer to determine how to forward packets.

The network layer 2010 can provide the functional and procedural means of transferring variable length data sequences from a source to a destination while maintaining the quality of service requested by the transport layer 2012 immediately above. The network layer 2010 performs network routing functions, and might also perform fragmentation and reassembly of data, and report data delivery errors. Routers can operate at this layer 2010, by sending data throughout the extended network and making the Internet possible.

4. The transport layer 2012 can provide transparent transfer of data between end users, providing reliable data transfer services to the upper layers. The transport layer 2012 accepts data from the session layer 2014 above and segments the data for transport across the network 102. In general, the transport layer 2012 may be responsible for making sure that the data can be delivered error-free and in proper sequence. Exemplary transport protocols that may be used on the Internet can include TCP, UDP or the like.

5. The session layer 2014 can provide Inter-host communication. The session layer 2014 may control the dialogues/connections (sessions) between computers. It establishes, manages and terminates the connections between the local 2018 and remote application (not shown). It provides for full-duplex, half-duplex, or simplex operation, and can establish check-pointing, adjournment, termination, restart procedures and the like. Multiplexing by this layer 2014 can enable data from several applications to be transmitted via a single physical link 102.

6. The presentation layer 2016 can provide functions including data representation and encryption. The presentation layer 2016 can establish a context between application layer entities, in which the higher-layers can have applied different syntax and semantics, as long as the presentation service being provided understands both, and the mapping between them. The presentation service data units are then encapsulated into Session Protocol Data Units, and moved down the stack.

The presentation layer 2016 provides a variety of coding and conversion functions that can be applied to data from the application layer 2018. These functions ensure that information sent from the application layer of one system would be readable by the application layer of another system. Some examples of presentation layer coding and conversion schemes include QuickTime, Motion Picture Experts Group (MPEG), Graphics Interchange Format (GIF), Joint Photographic Experts Group (JPEG), Tagged Image File Format (TIFF), and the like.

7. The application layer 2018 can link network process to application programs. The application layer interfaces directly to and performs common application services for the application processes; it also issues requests to the presentation layer 2016 below. Application layer 2018 processes can interact with software applications programs that may contain a communications component.

The application layer 1818 is the uppermost layer and thus the user and the application layer can interact directly with the software application, Examples of application layer functions include Telnet, File Transfer Protocol (FTP), Simple Mail Transfer Protocol (SMTP), and the like.

Newer equivalent IETF and IEEE protocols, as well as newer OSI protocols have been created, and may equivalently be utilized in the examples described. However, the original architecture of the original OSI model can be representative of conventional network architectures. Thus, not every communications protocol of the many possible models may fit into one of the seven layers of the basic OSI model, as they may be designed to other standards (for example the five layer TCP/IP model).

Figure 21:
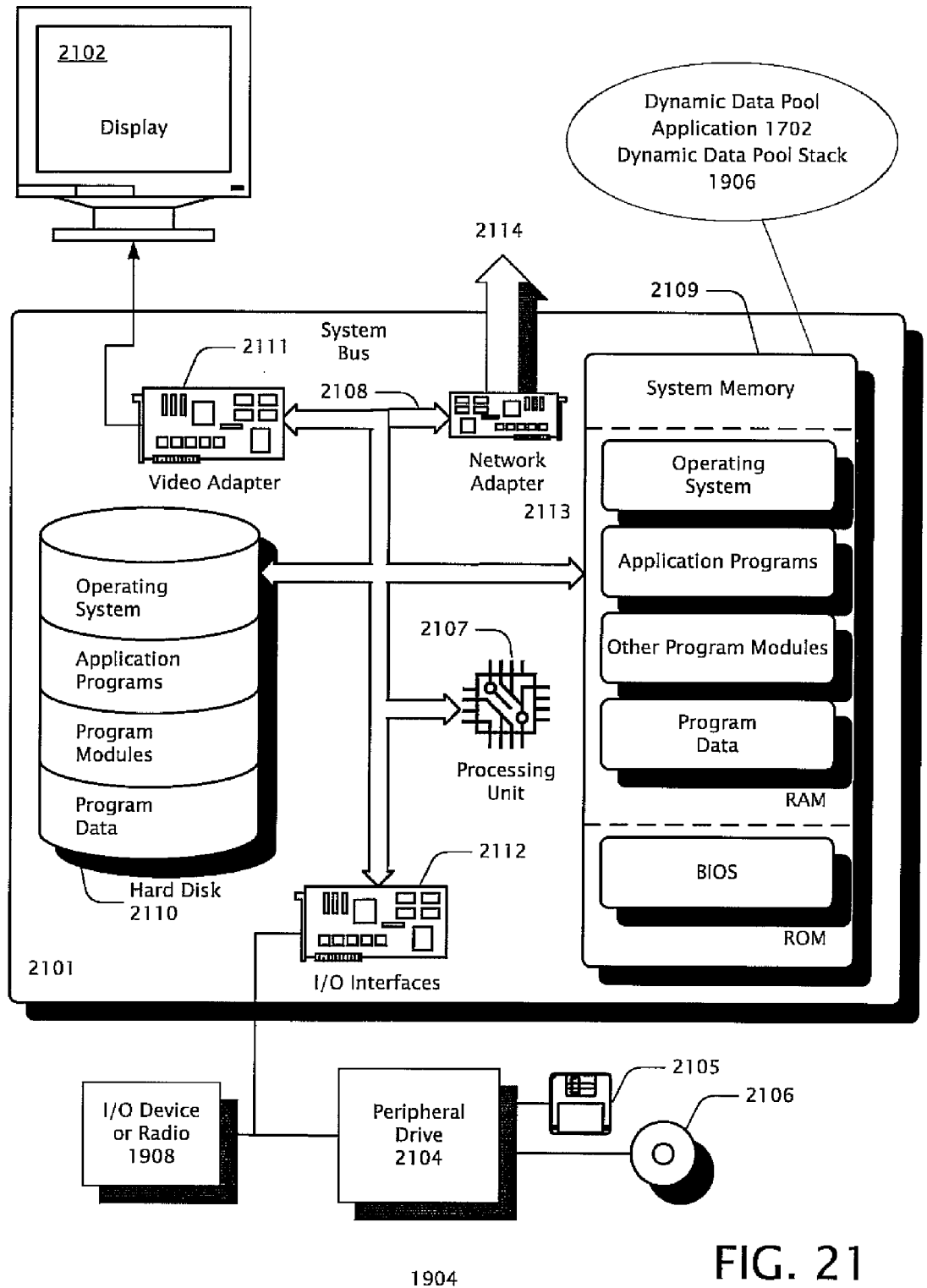
FIG. 21 illustrates an exemplary computing environment in which the Dynamic Data Pools and the processes advantageously utilizing the Dynamic Data Pools described in this application to establish ad-hoc networks, may be implemented.

FIG. 21 illustrates an exemplary computing environment 2104 in which the Dynamic Data Pools and the processes advantageously utilizing the Dynamic Data Pools 2102, 2106 described in this application to establish ad-hoc networks, may be implemented. Exemplary computing environment 2104 is only one example of a computing system and is not intended to limit the examples described in this application to this particular computing environment.

For example the computing environment 2104 can be implemented with numerous other general purpose or special purpose computing system configurations. Examples of well known computing systems, may include, but are not limited to, computer or processor controlled radio systems, personal computers, hand-held or laptop devices, microprocessorbased systems, multiprocessor systems, cellular telephones, PDAs, and the like which may be coupled to or otherwise integrated into a radio system.

The computer 2104 includes a general-purpose computing system in the form of a computing device 2101. The components of computing device 2101 can include one or more processors (including CPUs, GPUs, microprocessors and the like) 2107, a system memory 2109, and a system bus 2108 that couples the various system components. Processor 2107 processes various computer executable instructions, including those to create and utilize dynamic data pools as described above to control the operation of computing device 2101 and to communicate with other electronic and computing devices. The system bus 2108 represents any number of several types of bus structures, including a memory bus or memory controller, a peripheral bus, an accelerated graphics port, and a processor or local bus using any of a variety of bus architectures.

The system memory 2109 in which processes 2111 such as those providing a user interface, an application program for controlling dynamic data pools in ad-hoc networks and the layered network programming allowing logical channel structures and supporting messaging can be loaded. System memory can be loaded, includes computer-readable media in the form of volatile memory, such as random access memory (RAM), and/or non-volatile memory, such as read only memory (ROM). A basic input/output system (BIOS) is stored in ROM. RAM typically contains data and/or program modules that are immediately accessible to and/or presently operated on by one or more of the processors 2107.

Mass storage devices 2104 may be coupled to the computing device 2101 or incorporated into the computing device by coupling to the buss. Such mass storage devices 2104 may include a magnetic disk drive which reads from and writes to a removable, non volatile magnetic disk (e.g., a "floppy disk") 1905, or an optical disk drive that reads from and/or writes to a removable, non-volatile optical disk such as a CD ROM or the like 2106. Computer readable media 2105, 2106 typically embody computer readable instructions, data structures, program modules and the like supplied on floppy disks, CDs, portable memory sticks and the like. Such mass storage devices may have application programs, and layered network programming for providing dynamic data pools disposed on them. The computer may also be coupled to an exemplary peripheral 2108 such as a radio terminal, node or other device capable of being operated under computer control and for helping establish a dynamic data pool. Alternatively the processor may be integrated as part of the radio assembly, and coupled to the radio internal to the assembly.

Any number of program modules or processes such as those for implementing dynamic data pools 1906 can be stored on the hard disk 2110, Mass storage device 2104, ROM and/or RAM, can include by way of example, an operating system, one or more application programs, other program modules, and program data for providing dynamic data pools. Each of such operating system, application programs, other program modules and program data (or some combination thereof may include an embodiment of the systems and methods described herein that can dynamic data pools and creation of ad-hoc networks.

Computing device 2104 can operate in a networked environment using connections to one or more remote computers through one or more local area networks (LANs), wide area networks (WANs) and the like. The computing device 2101 can be connected to a network 2114 via a network adapter 2113 or alternatively by a modem (1908 of FIG. 19), DSL, ISDN interface or the like. In implementing dynamic data pools in an ad-hoc network, the computing device can operate in a wireless networking environment, typically as a controller of a cell phone, radio, or the like.

A display 2102 may be provided as a user interface. Such advice may be a conventional LCD, Plasma, CRT or the like. In addition the display may be a conventionally constructed touch sensitive display in an alternative example to provide additional user interactivity. The display 2102 can be coupled to the system bus 2108 via a conventional network adapter card 2111, or the like. The display 2102 can provide a display of the functions of the dynamic data pool application 2102, and/or the Dynamic data pool stack 2106. Functions displayed may include a current list of nodes in the swarm and the like.

Those skilled in the art will realize that the process sequences described above may be equivalently performed in any order to achieve a desired result. Also, sub-processes may typically be omitted as desired without taking away from the overall functionality of the processes described above.

Those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributive process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Those skilled in the art will realize that the process sequences described above may be equivalently performed in any order to achieve a desired result. Also, sub-processes may typically be omitted as desired without taking away from the overall functionality of the processes described above.

Those skilled in the art will realize that storage devices, such as those used in providing dynamic data pool management, utilized to store program instructions can be distributed across a network. For example a remote computer may store an example of the process described as software. A local or terminal computer may access the remote computer and download a part or all of the software to run the program. Alternatively the local computer may download pieces of the software as needed, or distributive process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

What is claimed is:

1. A dynamic data pool comprising:
   a swarm including a plurality of nodes;
   a master node formed from a first node of the plurality of nodes with a remaining plurality of nodes; and
   a plurality of slave nodes formed from the remaining nodes of the plurality of nodes in which the plurality of slave nodes are capable of forming a relay node if a second master node is detected.

2. The dynamic data pool of claim 1, in which the swarm includes a repository of dynamic data.

3. The dynamic data pool of claim 1, in which the master node may be selected by swarm initialization.

4. The dynamic data pool of claim 1, in which a new node may join the swarm by an initialization routine.

5. The dynamic data pool of claim 1, in which a node of the plurality of nodes that has lost contact with the swarm may rejoin the swarm to become a reconnected node.

6. The dynamic data pool of claim 1, in which the reconnected node reconciles its data repository with a swarm repository.

7. The dynamic data pool of claim 1, in which node proximity is determined by a hop count.

8. The dynamic data pool of claim 1, in which a plurality of master nodes may be formed by utilizing a relay node.

9. A method for creating a dynamic data pool comprising:
determining that a radio is a first on site adio;
electing the first on site radio as a master node;
collecting data;
incrementing a dynamic data pool version number; and
transmitting a data synchronization signal.

10. The method for creating a dynamic data pool of claim 9, further comprising:
detecting a synchronization signal by a second on site radio; and
electing the second on site radio as a slave.

11. The method for creating a dynamic data pool of claim 9, further comprising exchanging data between the master and the slave.

12. The method for creating a dynamic data pool of claim 9, further comprising detecting a second master.

13. The method for creating a dynamic data pool of claim 9, further comprising establishing a relay mechanism.

14. The method for creating a dynamic data pool of claim 9, further comprising allowing the second master to join the swarm.

15. A swarm radio comprising:
a processor implementing a dynamic data pool application;
a data base configured to be synchronized with a plurality of other data bases of a plurality of other swarm radios such that the synchronized data bases form a dynamic data pool; and
a modem coupled to the processor for converting instructions received by the processor to a packetized radio signal.

16. The swarm radio of claim 15, further comprising a dynamic data pool network programming stack implemented by the processor.

17. The swarm radio of claim 15, in which the packetized radio signal includes dynamic data pool synchronization information.

18. The swarm radio of claim 15 in which the packetized radio signal includes an updated information signal for the dynamic data pool.

19. The swarm radio of claim 15, in which the data base is synchronized with the dynamic data pool.

20. The swarm radio of claim 15, in which the swarm radio initially seeks a master swarm radio.

* * * * *

UNITED STATES PATENT AND TRADEMARK OFFICE
CERTIFICATE OF CORRECTION

PATENT NO. : 8,406,687 B2  
APPLICATION NO. : 12/139331  
DATED : March 26, 2013  
INVENTOR(S) : Timothy Thome et al.

Page 1 of 1

It is certified that error appears in the above-identified patent and that said Letters Patent is hereby corrected as shown below:

In the Claims

Column 17  
Line 14, delete "on site adio;" and replace with -- on site radio; --.

Signed and Sealed this  
Fifteenth Day of October, 2013

Teresa Stanek Rea  
*Deputy Director of the United States Patent and Trademark Office*